US011931871B2

(12) United States Patent
Tashima et al.

(10) Patent No.: US 11,931,871 B2
(45) Date of Patent: Mar. 19, 2024

(54) BINDING MACHINE

(71) Applicant: MAX CO., LTD., Tokyo (JP)

(72) Inventors: Nobutaka Tashima, Tokyo (JP); Masato Utsugi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 17/964,531

(22) Filed: Oct. 12, 2022

(65) Prior Publication Data

US 2023/0122502 A1 Apr. 20, 2023

(30) Foreign Application Priority Data

Oct. 20, 2021 (JP) ................................ 2021-171967

(51) Int. Cl.

| | |
|---|---|
| ***B21F 15/04*** | (2006.01) |
| ***B21F 11/00*** | (2006.01) |
| ***B21F 23/00*** | (2006.01) |
| ***B25B 25/00*** | (2006.01) |
| ***E04G 21/12*** | (2006.01) |

(52) U.S. Cl.

CPC .............. *B25B 25/00* (2013.01); *B21F 11/00* (2013.01); *B21F 15/04* (2013.01); *B21F 23/005* (2013.01); *E04G 21/123* (2013.01)

(58) Field of Classification Search

CPC .......... B21F 15/00; B21F 15/02; B21F 15/04; B65B 13/22; B65B 13/28; B65B 13/285; B65B 13/025; B65B 13/04; B65B 13/06; B65B 27/10; B25B 25/00; E04G 21/123

See application file for complete search history.

(56) References Cited

U.S. PATENT DOCUMENTS

| | | | | |
|---|---|---|---|---|
| 2018/0155940 | A1* | 6/2018 | Nagaoka ............... | E04G 21/123 |
| 2020/0399914 | A1 | 12/2020 | Nagaoka et al. | |
| 2022/0325543 | A1 | 10/2022 | Matsuno et al. | |

FOREIGN PATENT DOCUMENTS

| | | | | |
|---|---|---|---|---|
| EP | 1418124 A1 * | 5/2004 | ............ | B65B 13/02 |
| EP | 1418124 A1 | 5/2004 | | |
| EP | 3327224 A1 | 5/2018 | | |
| EP | 3862512 A1 | 8/2021 | | |
| JP | 6763385 B2 | 9/2020 | | |
| WO | 2021/070481 A1 | 4/2021 | | |

OTHER PUBLICATIONS

Extended European Search Report dated Mar. 16, 2023, issued by the European Patent Office in the corresponding European Patent Application No. 22201919.2. (9 pages).

* cited by examiner

*Primary Examiner* — Bobby Yeonjin Kim

(74) *Attorney, Agent, or Firm* — Banner & Witcoff, Ltd.

(57) ABSTRACT

A binding machine includes a wire feeding unit, a curl forming unit, a cutting unit, and a binding unit. The binding unit includes a locking member that includes a first hook and a second hook and that locks the wire by moving the first hook toward the second hook. The locking member includes a locking part that locks the wire in a state in which the first hook has been moved toward the second hook, and an unlocking part that makes it possible for the first hook to be movable away from the second hook with such an amount of movement that the locked wire does not come off between the first hook and the second hook.

6 Claims, 19 Drawing Sheets

BINDING MACHINE

CROSS-REFERENCE TO RELATED APPLICATIONS

The present application claims priority from Japanese Patent Application No. 2021-171967 filed on Oct. 20, 2021, the entire content of which is incorporated herein by reference.

TECHNICAL FIELD

The present invention relates to a binding machine configured to bind a to-be-bound object such as a reinforcing bar with a wire.

BACKGROUND ART

For concrete buildings, reinforcing bars are used so as to improve strength. The reinforcing bars are bound with wires so that the reinforcing bars do not deviate from predetermined positions during concrete placement.

In the related art, suggested is a binding machine referred to as a reinforcing bar binding machine configured to wind a wire on two or more reinforcing bars and to twist the wire wound on the reinforcing bars, thereby binding the two or more reinforcing bars with the wire.

The reinforcing bar binding machine includes a feeding means capable of feeding a wire and winding the wire around a to-be-bound object, and a binding means for gripping and twisting the wire, in which the binding means includes a pair of gripping members whose other end sides are rotatably supported so that one end sides can move in directions toward and away from each other. The reinforcing bar binding machine is configured to grip the wire as the gripping members move toward each other (for example, refer to JP6763385B).

In the operation of gripping (locking) the wire, a reactive force of a force of pressing the wire between the pair of gripping members (hooks) is applied to a motor that drives the binding means, and becomes a load of the motor.

The present invention has been made so as to solve the problem, and an object thereof is to provide a binding machine capable of reducing a reactive force of a force of pressing a wire between a pair of hooks in an operation of locking the wire.

SUMMARY

According to an aspect of the present invention, there is provided a binding machine including a wire feeding unit configured to feed a wire, a curl forming unit configured to form a path along which the wire fed by the wire feeding unit is to be wound around an object, a cutting unit configured to cut the wire wound on the object, and a binding unit configured to twist the wire wound on the object and cut by the cutting unit. The binding unit includes a locking member that includes a first hook and a second hook and that locks the wire by moving the first hook toward the second hook. The locking member includes a locking part configured to lock the wire in a state in which the first hook has been moved toward the second hook, and an unlocking part configured to make it possible for the first hook to be movable away from the second hook with such an amount of movement that the locked wire does not come off between the first hook and the second hook.

In the present invention, in the state in which at least one hook has been moved toward the other hook, the operation of locking the wire, and the operation of making it possible for at least one hook to be movable away from the other hook with such an amount of movement that the locked wire does not come off between one hook and the other hook are switched.

According to the present invention, at a timing other than an operation in which the wire is required to be locked by the locking member, at least one hook is made to be movable away from the other hook with such an amount of movement that the locked wire does not come off between one hook and the other hook. Thereby, a reactive force of a force of pressing the wire between one hook and the other hook is reduced. As a result, a load that is applied to the motor that drives the binding unit is reduced.

DESCRIPTION OF EMBODIMENTS

Hereinafter, an example of a reinforcing bar binding machine as an embodiment of the binding machine of the present invention will be described with reference to the drawings.

<Overall Configuration Example of Reinforcing Bar Binding Machine of Present Embodiment>

Figure 1:
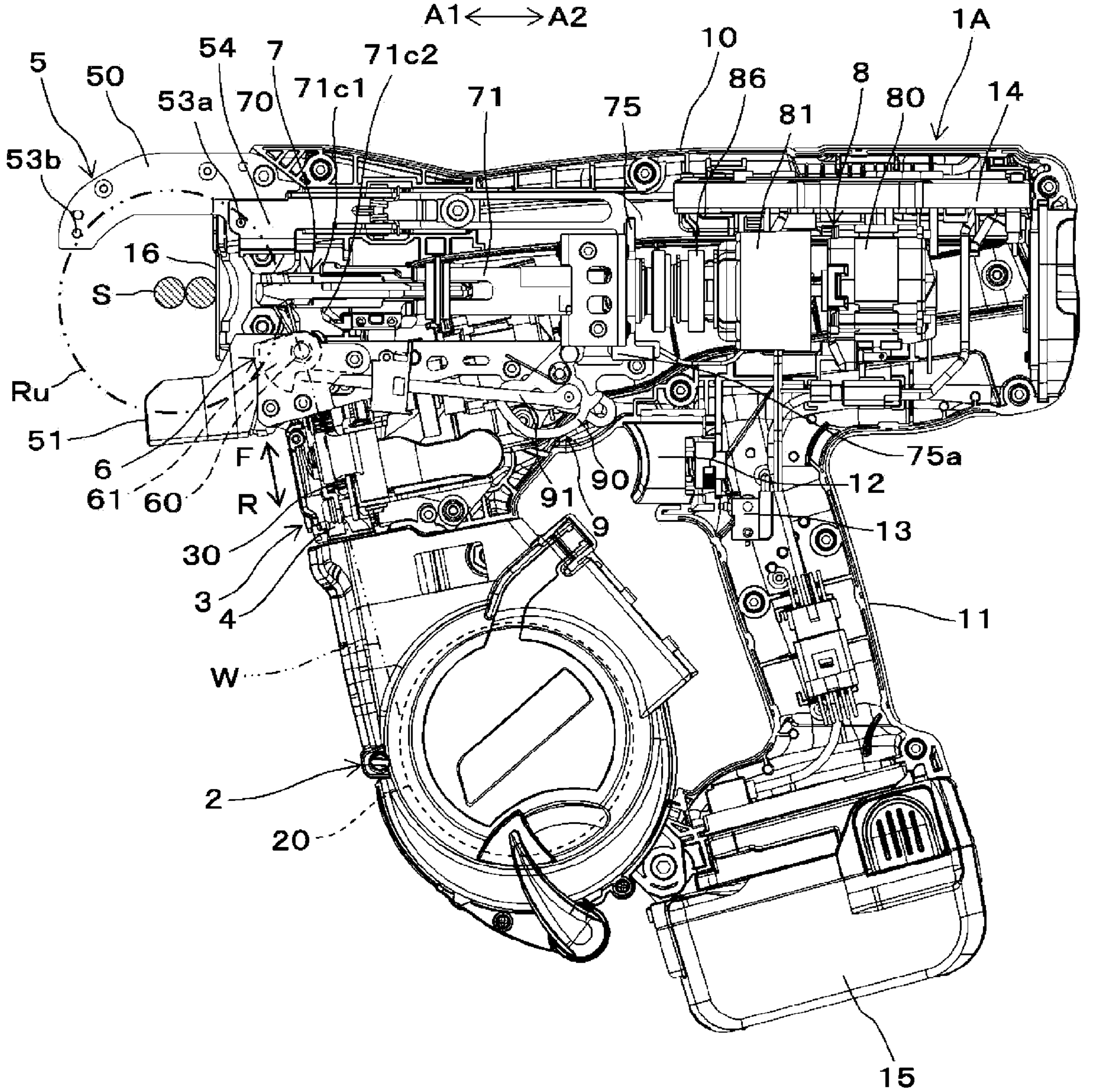
FIG. 1 is an internal configuration view showing an example of an overall configuration of a reinforcing bar binding machine of the present embodiment, as seen from a side.

FIG. 1 is an internal configuration view showing an example of an overall configuration of a reinforcing bar binding machine of the present embodiment, as seen from a side.

A reinforcing bar binding machine 1A is configured to feed a wire W in a forward direction denoted with an arrow F, to wind the wire around reinforcing bars S, which are a to-be-bound object (an object), to feed the wire W wound around the reinforcing bars S in a reverse direction denoted with an arrow R, to wind the wire on the reinforcing bars S, to cut the wire, and to twist the wire W, thereby binding the reinforcing bars S with the wire W.

The reinforcing bar binding machine 1A includes a magazine 2 in which the wire W is accommodated, a wire feeding unit 3 configured to feed the wire W, and a wire guide 4 configured to guide the wire W, so as to implement the above-described functions. In addition, the reinforcing bar binding machine 1A includes a curl forming unit 5 configured to form a path along which the wire W fed by the wire feeding unit 3 is to be wound around the reinforcing bars S, and a cutting unit 6 configured to cut the wire W wound on the reinforcing bars S. Further, the reinforcing bar binding machine 1A includes a binding unit 7 configured to twist the wire W wound on the reinforcing bars S, a drive unit 8 configured to drive the binding unit 7, and a transmission unit 9 configured to transmit an operation of the binding unit 7 to the cutting unit 6.

Further, the reinforcing bar binding machine 1A has such a form that an operator grips and uses with a hand, and has a main body part 10 and a handle part 11.

The magazine 2 is an example of the accommodation unit, and a reel 20 on which the long wire W is wound to be reeled out is rotatably and detachably accommodated therein. For the wire W, a wire made of a plastically deformable metal wire, a wire having a metal wire covered with a resin, or a twisted wire is used.

In a configuration in which the reinforcing bars S are bound with one wire W, one wire W is wound on a hub part (not shown) of the reel 20, and one wire W can be pulled out while the reel 20 rotates. In addition, in a configuration in which the reinforcing bars S are bound with a plurality of wires W, the plurality of wires W are wound on the hub part, and the plurality of wires W can be pulled out at the same time while the reel 20 rotates. For example, in a configuration in which the reinforcing bars S are bound with two wires W, the two wires W are wound on the hub part, and the two wires W can be pulled out at the same time while the reel 20 rotates.

The wire feeding unit 3 includes a pair of feeding gears 30 configured to sandwich and feed the wire W. The wire feeding unit 3 is configured such that a rotating operation of a feeding motor (not shown) is transmitted to rotate the feeding gears 30. Thereby, the wire feeding unit 3 is configured to feed the wire W sandwiched between the pair of feeding gears 30 along an extension direction of the wire W. In a configuration in which a plurality of, for example, two wires W are fed to bind the reinforcing bars S, the two wires W are fed aligned in parallel.

The wire feeding unit 3 is configured such that a rotation direction of the feeding motor (not shown) is switched between forward and reverse directions to switch rotation directions of the feeding gears 30, thereby feeding the wire W in the forward direction denoted with the arrow F, feeding the wire W in the reverse direction denoted with the arrow R, or switching the feeding direction of the wire W between the forward and reverse directions.

The wire guide 4 is provided at a predetermined position on an upstream side and a downstream side of the wire feeding unit 3 with respect to a feeding direction of feeding the wire W in the forward direction, respectively. In the configuration in which the two wires W are fed to bind the reinforcing bars S, the wire guide 4 provided on the upstream side of the wire feeding unit 3 is configured to regulate the two wires W in a radial direction, to align the two introduced wires W in parallel and to guide the wires between the pair of feeding gears 30. The wire guide 4 provided on the downstream side of the wire feeding unit 3 is configured to regulate the two wires W in the radial direction, to align the two introduced wires W in parallel, and to guide the wires toward the cutting unit 6 and the curl forming unit 5.

The curl forming unit 5 includes a curl guide 50 configured to curl the wire W that is fed by the wire feeding unit 3, and an induction guide 51 configured to guide the wire W curled by the curl guide 50 toward the binding unit 7. In the reinforcing bar binding machine 1A, the path of the wire W that is fed by the wire feeding unit 3 is regulated by the curl forming unit 5, so that a locus of the wire W becomes a loop Ru as shown with a dashed-two dotted line in FIG. 1 and the wire W is thus wound around the reinforcing bars S.

In the reinforcing bar binding machine 1A, the curl guide 50 and the induction guide 51 of curl forming unit 5 are provided at an end portion on a front side of the main body part 10.

The cutting unit 6 includes a fixed blade part 60 and a movable blade part 61 configured to cut the wire W in cooperation with the fixed blade part 60. The cutting unit 6A is configured to cut the wire W by a rotating operation of the movable blade part 61 about the fixed blade part 60 as a fulcrum shaft. In the present specification, the cutting unit 6 is described as the fixed blade part 60 and the movable blade part 61 configured to rotate about the fixed blade part 60 as a fulcrum shaft. However, the movable blade part 61 may be of a slide type configured to linearly slide, not to rotate.

The transmission unit 9 includes a cam 90 configured to rotate by an operation of the binding unit 7, and a link 91 configured to connect the cam 90 and the movable blade part 61. The transmission unit 9 is configured to transmit the operation of the binding unit 7 to the movable blade part 61 of the cutting unit 6 via the cam 90 and the link 91.

The binding unit 7 includes a locking member 70 configured to lock the wire W, and a sleeve 71 configured to actuate the locking member 70. The drive unit 8 includes a motor 80, and a decelerator 81 configured to perform deceleration and amplification of torque.

The binding unit 7 is configured to be driven by the drive unit 8, whereby the sleeve 71 actuates the locking member 70 to lock the wire W. In addition, the binding unit 7 is configured to bind the reinforcing bars S by twisting the wire W after cutting the wire W by the cutting unit 6 in conjunction with the operation of the sleeve 71.

In the reinforcing bar binding machine 1A, the wire feeding unit 3, the wire guide 4, the cutting unit 6, the binding unit 7, the drive unit 8, the transmission unit 9, and the like are accommodated within the main body part 10. In the reinforcing bar binding machine 1A, the binding unit 7 is provided inside a front side of the main body part 10, and the drive unit 8 is provided inside a rear side. In addition, in the reinforcing bar binding machine 1A, a butting portion 16 against which the reinforcing bars S are to be butted is provided at an end portion on the front side of the main body part 10 and between the curl guide 50 and the induction guide 51.

Further, in the reinforcing bar binding machine 1A, the handle part 11 extends downward from the main body part 10, and a battery 15 is detachably mounted to a lower part of the handle part 11. In addition, in the reinforcing bar binding machine 1A, the magazine 2 is provided in front of the handle part 11.

In the reinforcing bar binding machine 1A, a trigger 12 is provided on a front side of the handle part 11, and a switch 13 is provided inside the handle part 11. In the reinforcing bar binding machine 1A, a control unit 14 is configured to control the motor 80 and a feeding motor (not shown), in response to a state of the switch 13 that is pressed by an operation on the trigger 12.

<Configuration Example of Main Parts of Reinforcing Bar Binding Machine of Present Embodiment>

Figure 2A:
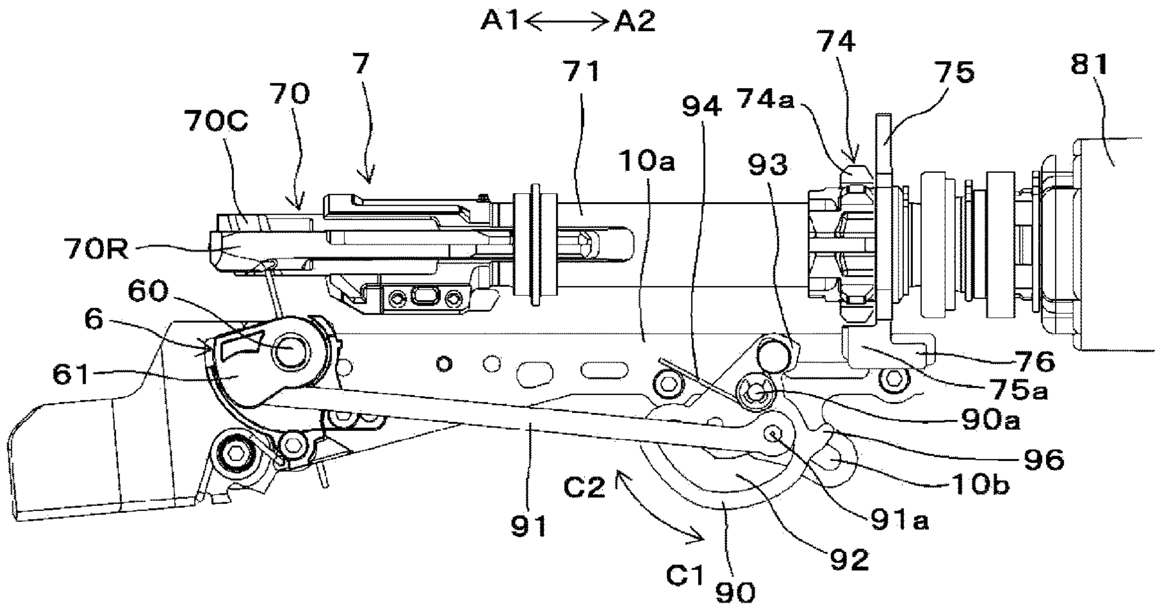
FIG. 2A is an internal configuration view showing an example of a main part configuration of the reinforcing bar binding machine of the present embodiment, as seen from a side.
Figure 2B:
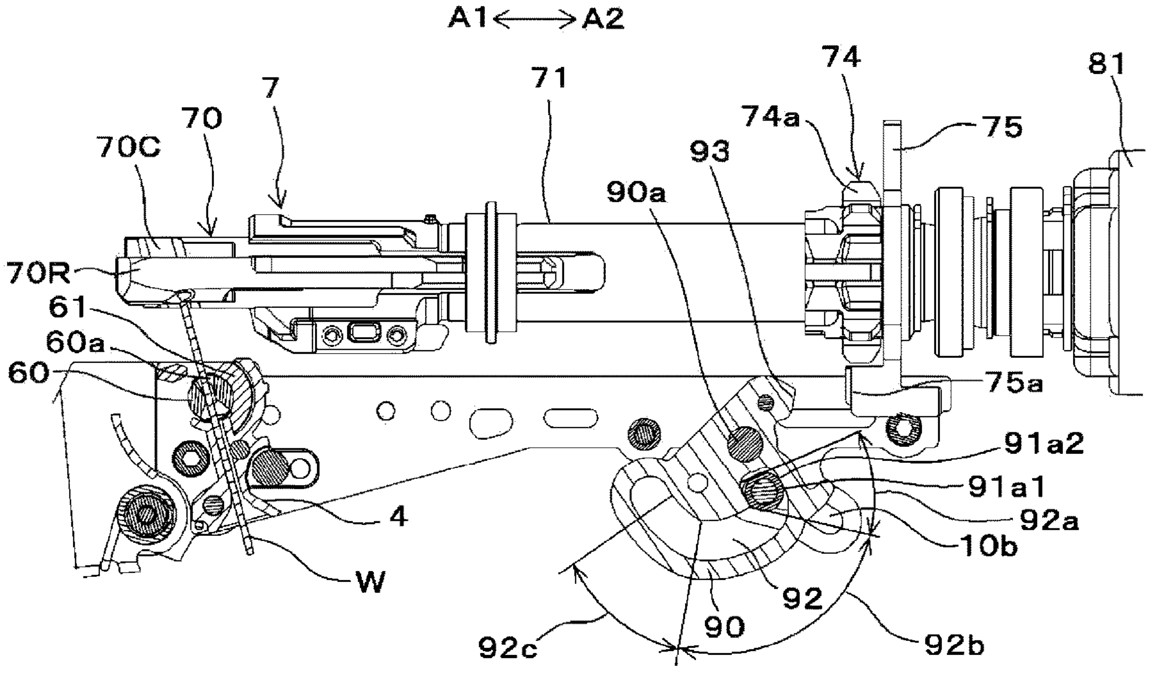
FIG. 2B is an internal configuration view showing the example of the main part configuration of the reinforcing bar binding machine of the present embodiment, as seen from a side.
Figure 2C:
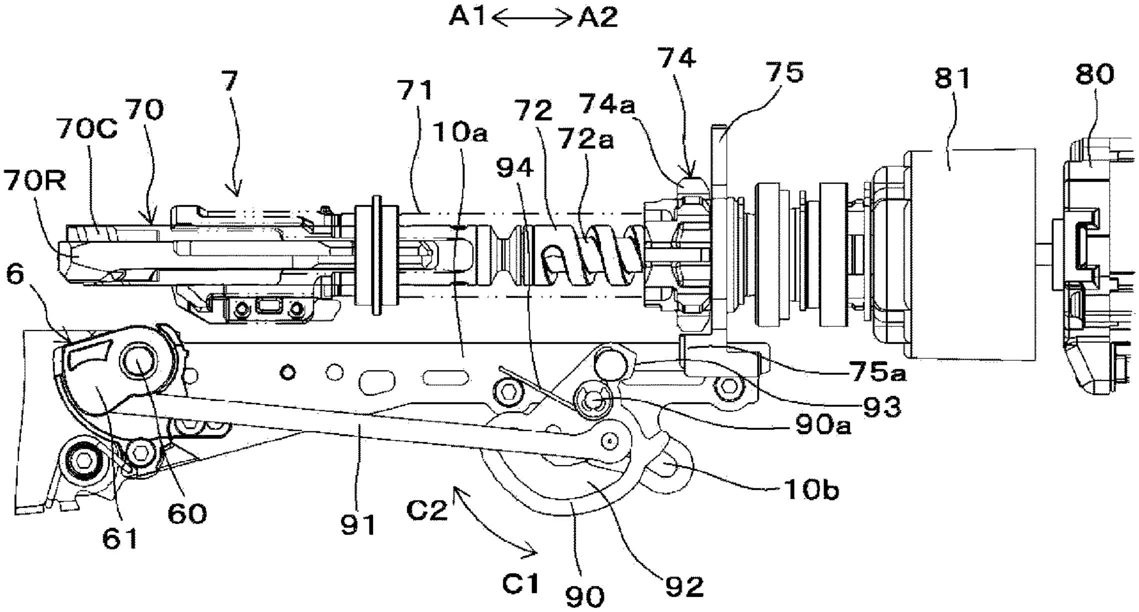
FIG. 2C is an internal configuration view showing the example of the main part configuration of the reinforcing bar binding machine of the present embodiment, as seen from a side.
Figure 3A:
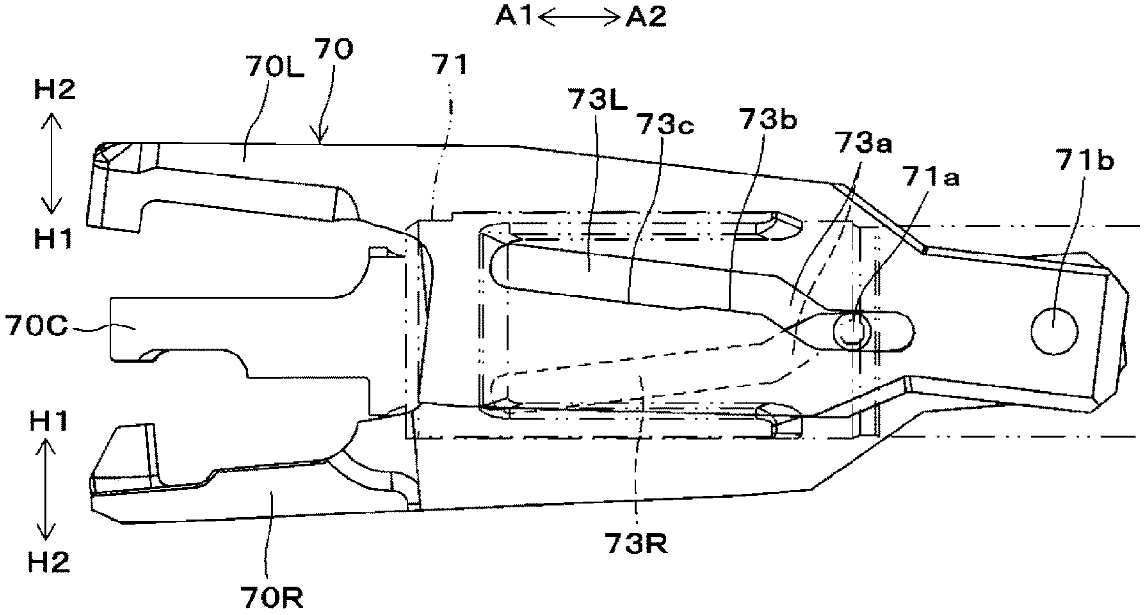
FIG. 3A is a plan view showing an example of a binding unit according to the present embodiment.
Figure 3B:
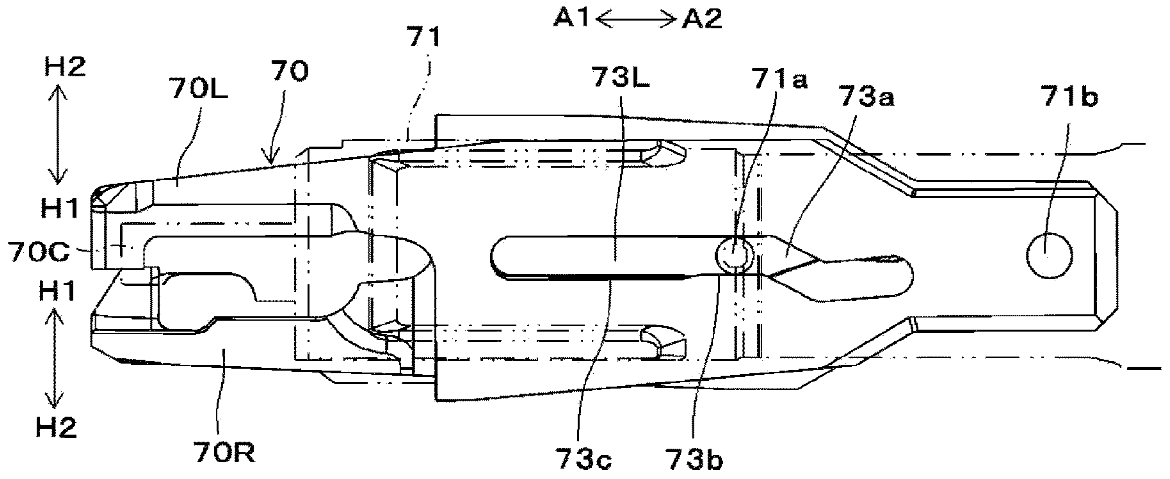
FIG. 3B is a plan view showing the example of the binding unit according to the present embodiment.
Figure 3C:
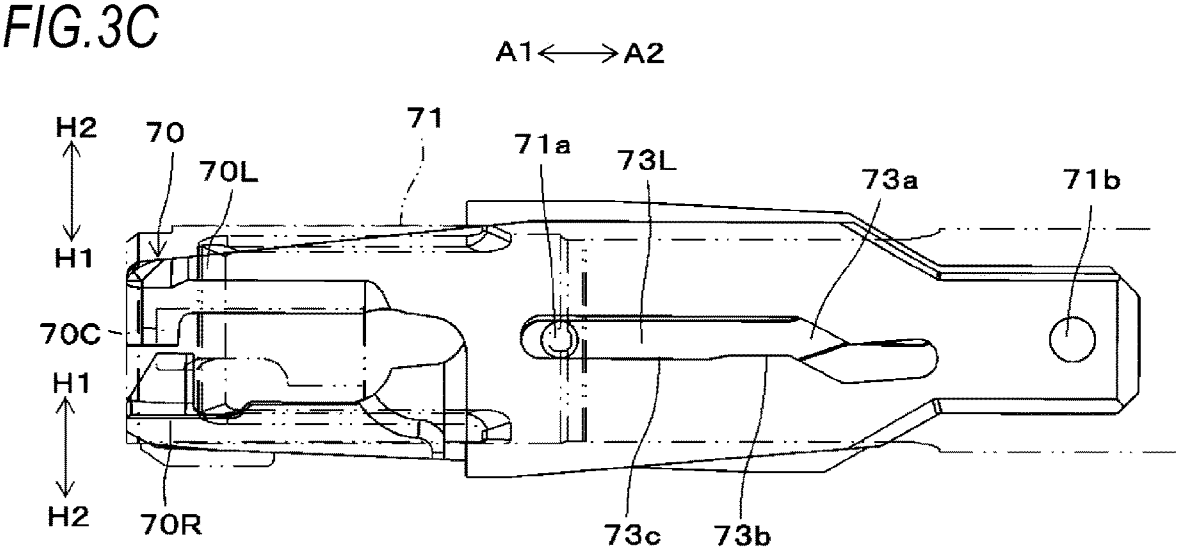
FIG. 3C is a plan view showing the example of the binding unit according to the present embodiment.
Figure 3D:
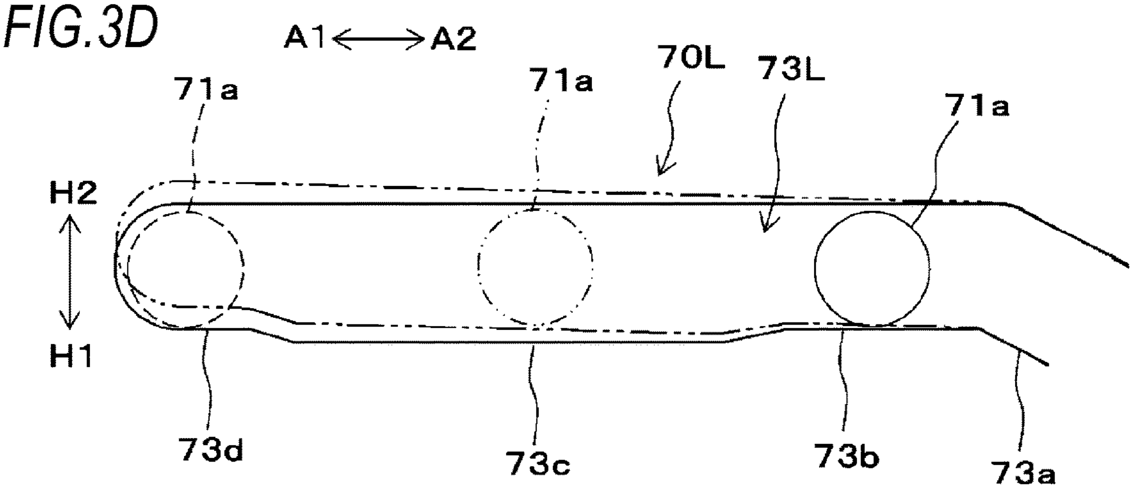
FIG. 3D is a plan view of main parts showing a modified embodiment of the binding unit according to the present embodiment.
Figure 3E:
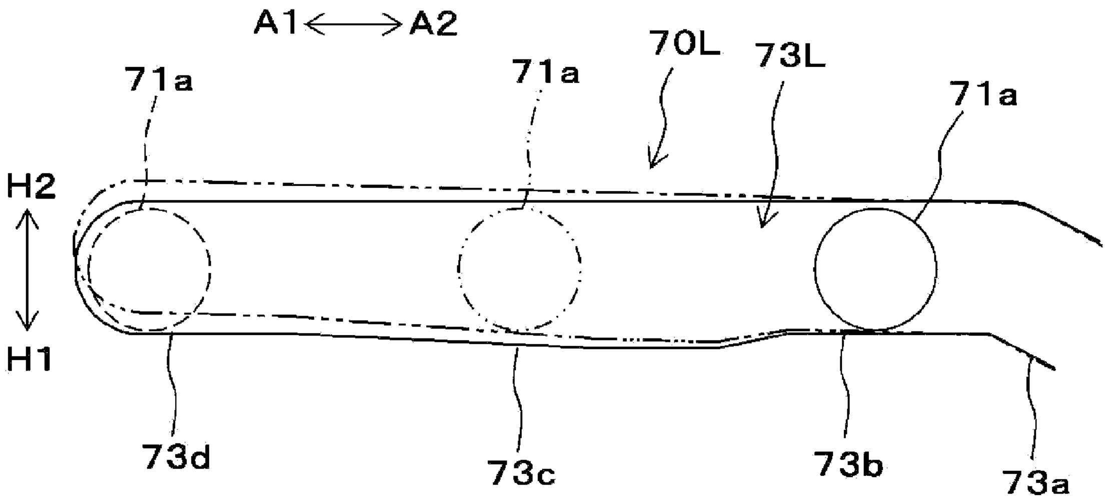
FIG. 3E is a plan view of main parts showing a modified embodiment of the binding unit according to the present embodiment.
Figure 3F:
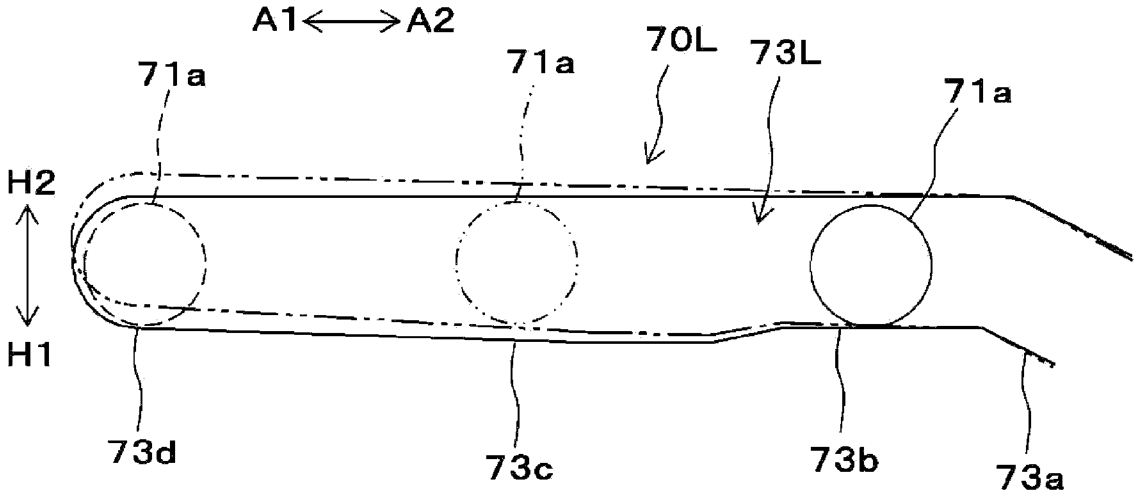
FIG. 3F is a plan view of main parts showing a modified embodiment of the binding unit according to the present embodiment.

FIGS. 2A to 2C are internal configuration views showing an example of a main part configuration of the reinforcing bar binding machine of the present embodiment, as seen from a side, in which FIG. 2A mainly shows the binding unit 7, the cutting unit 6 and the transmission unit 9, FIG. 2B is a cross-sectional view of the cutting unit 6 and the transmission unit 9 in FIG. 2A, and FIG. 2C shows the internal configuration by showing an outer shape of the sleeve 71 in FIG. 2A with a dashed-two dotted line. In addition, FIGS. 3A to 3C are plan views showing an example of the binding unit of the present embodiment, and FIGS. 3D to 3F are plan views of main parts showing modified embodiments of the binding unit of the present embodiment.

Example of Embodiment of Binding Unit

Next, an example of the binding unit of the present embodiment will be described with reference to each drawing. The binding unit 7 has a rotary shaft 72 configured to move and rotate the sleeve 71, thereby actuating the locking member 70. The binding unit 7 and the drive unit 8 are configured such that the rotary shaft 72 and the motor 80 are connected via the decelerator 81 and the rotary shaft 72 is driven by the motor 80 via the decelerator 81.

The locking member 70 includes a center hook 70C (a first hook) connected to the rotary shaft 72, and a first side hook 70R and a second side hook 70L (a second hook) configured to open/close with respect to the center hook 70C.

In the binding unit 7, a side on which the center hook 70C, the first side hook 70R and the second side hook 70L are provided is referred to as a front side, and a side on which the rotary shaft 72 is connected to the decelerator 81 is referred to as a rear side.

The center hook 70C is connected to a front end of the rotary shaft 72, which is one end portion, via a configuration that can rotate with respect to the rotary shaft 72, can rotate integrally with the rotary shaft 72 and can move integrally with the rotary shaft 72 in an axis direction.

A tip end side of the first side hook 70R, which is one end portion along the axis direction of the rotary shaft 72, is located on one side part with respect to the center hook 70C. In addition, a rear end side of the first side hook 70R, which is the other end portion along the axis direction of the rotary shaft 72, is rotatably supported to the center hook 70C by a shaft 71*b*.

A tip end side of the second side hook 70L, which is one end portion along the axis direction of the rotary shaft 72, is located on the other side part with respect to the center hook 70C. In addition, a rear end side of the second side hook

70L, which is the other end portion along the axis direction of the rotary shaft 72, is rotatably supported to the center hook 70C by the shaft 71*b*.

Thereby, the locking member 70 is configured to open/close in directions in which the tip end side of the first side hook 70R is contacted/separated with respect to the center hook 70C by a rotating operation about the shaft 71*b* as a fulcrum. The locking member is also configured to open/close in directions in which the tip end side of the second side hook 70L is contacted/separated with respect to the center hook 70C.

The rotary shaft 72 is connected at a rear end, which is the other end portion, to the decelerator 81 via a connection portion 72*b* having a configuration of enabling the rotary shaft 72 to rotate integrally with the decelerator 81 and to move in the axis direction with respect to the decelerator 81. The connection portion 72*b* has a spring 72*c* for urging backward the rotary shaft 72 toward the decelerator 81, and regulating a position of the rotary shaft 72 along the axis direction. Thereby, the rotary shaft 72 is configured to be movable forward away from the decelerator 81 while receiving a force pushed backward by the spring 72*c*. Accordingly, the rotary shaft 72 and the locking member 70 connected to the rotary shaft 72 can move forward up to a predetermined amount defined by the connection portion 72*b* while receiving the force pushed backward by the spring 72*c*.

The sleeve 71 has such a shape that a range of a predetermined length along the axis direction of the rotary shaft 72 from an end portion in the forward direction denoted with the arrow A1 is divided into two in a radial direction and the first side hook 70R and the second side hook 70L enter. In addition, the sleeve 71 is formed in a cylindrical shape configured to cover around the rotary shaft 72, and has a convex portion (not shown) protruding from an inner peripheral surface of a cylinder-shaped space in which the rotary shaft 72 is inserted, and the convex portion enters a groove portion of a feeding screw 72*a* formed along the axis direction on an outer periphery of the rotary shaft 72.

When the rotary shaft 72 rotates, the sleeve 71 is moved in a front and rear direction along the axis direction of the rotary shaft 72 according to a rotation direction of the rotary shaft 72 by an action of the convex portion (not shown) and the feeding screw 72*a* of the rotary shaft 72. In addition, when the sleeve 71 is moved to a forward end portion of the feeding screw 72*a* along the axis direction of the rotary shaft 72, the sleeve is rotated integrally with the rotary shaft 72.

The sleeve 71 has an opening/closing pin 71*a* configured to open/close the first side hook 70R and the second side hook 70L. The first side hook 70R has an opening/closing guide hole 73R (a guide hole) into which the opening/closing pin 71*a* is inserted, and the second side hook 70L has an opening/closing guide hole 73L into which the opening/closing pin 71*a* is inserted.

The opening/closing guide holes 73R and 73L are configured by grooves extending along a moving direction of the sleeve 71. The opening/closing guide hole 73R has an opening/closing portion 73*a* having a shape of converting linear motion of the opening/closing pin 71*a* configured to move in conjunction with the sleeve 71 into an opening/closing operation by rotation of the first side hook 70R about the shaft 71*b* as a fulcrum. In addition, the opening/closing guide hole 73L has an opening/closing portion 73*a* having a shape of converting linear motion of the opening/closing pin 71*a* configured to move in conjunction with the sleeve 71 into an opening/closing operation by rotation of the second side hook 70L about the shaft 71*b* as a fulcrum. The opening/closing portion 73*a* is configured by a groove inclined with respect to the moving direction of the sleeve 71 and the opening/closing pin 71*a*.

When the sleeve 71 is moved forward (denoted with the arrow A1) in a state where the first side hook 70R is opened with respect to the center hook 70C, the first side hook 70R is pushed by the opening/closing pin 71*a*, on an inner wall surface of the opening/closing portion 73*a* formed in the opening/closing guide hole 73R with respect to a direction in which the first side hook 70R is closed. Thereby, the first side hook 70R is rotated about the shaft 71*b* as a fulcrum and is moved toward the center hook 70C as denoted with the arrow H1.

When the sleeve 71 is moved backward (denoted with the arrow A2) in a state where the first side hook 70R is closed with respect to the center hook 70C, the first side hook 70R is pushed by the opening/closing pin 71*a*, on an outer wall surface of the opening/closing portion 73*a* formed in the opening/closing guide hole 73R with respect to a direction in which the first side hook 70R is opened. Thereby, the first side hook 70R is rotated about the shaft 71*b* as a fulcrum and is moved away from the center hook 70C as denoted with the arrow H2.

When the sleeve 71 is moved forward (denoted with the arrow A1) in a state where the second side hook 70L is opened with respect to the center hook 70C, the second side hook 70L is pushed by the opening/closing pin 71*a*, on an inner wall surface of the opening/closing portion 73*a* formed in the opening/closing guide hole 73L with respect to a direction in which the second side hook 70L is closed. Thereby, the second side hook 70L is rotated about the shaft 71*b* as a fulcrum and is moved toward the center hook 70C as denoted with the arrow H1.

When the sleeve 71 is moved backward (denoted with the arrow A2) in a state where the second side hook 70L is closed with respect to the center hook 70C, the second side hook 70L is pushed by the opening/closing pin 71*a*, on an outer wall surface of the opening/closing portion 73*a* formed in the opening/closing guide hole 73L with respect to a direction in which the second side hook 70L is opened. Thereby, the second side hook 70L is rotated about the shaft 71*b* as a fulcrum and is moved away from the center hook 70C as denoted with the arrow H2.

The opening/closing guide hole 73L provided in the second side hook 70L has a locking portion 73*b* and an unlocking portion 73*c*. The opening/closing guide hole 73L is formed with the locking portion 73*b* on a downstream side of the opening/closing portion 73*a* and is formed with the unlocking portion 73*c* on a downstream side of the locking portion 73*b*, with respect to the forward moving direction of the sleeve 71 denoted with the arrow A1.

The locking portion 73*b* is formed on the inner wall surface (a first portion of the inner wall surface) of the opening/closing guide hole 73L facing toward the direction of the arrow H1, which is the direction in which the second side hook 70L is closed. The locking portion 73*b* faces the outer wall surface of the opening/closing guide hole 73L with a dimension substantially equivalent to a diameter of the opening/closing pin 71*a*, and extends in parallel to the outer wall surface.

The unlocking portion 73*c* is configured by providing the inner wall surface (a second portion of the inner wall surface) of the opening/closing guide hole 73L with a concave portion that is concave with respect to the lock portion 73*b*. The unlocking portion 73*c* faces the outer wall surface of the opening/closing guide hole 73L with a dimension slightly greater than the diameter of the opening/closing pin 71*a*, and extends in parallel to the outer wall surface.

As shown in FIG. 3B, the second side hook 70L is configured to lock the wire W in a state in which it does not allow movement of the wire W within a range in which the opening/closing pin 71*a* is located at the locking portion 73*b* of the opening/closing guide hole 73L. Here, within the range in which the opening/closing pin 71*a* is located at the locking portion 73*b* of the opening/closing guide hole 73L, operations of feeding the wire W in the reverse direction and winding the wire on the reinforcing bars S are performed, as described later.

On the other hand, within a range in which the opening/closing pin 71*a* is moved in the direction of the arrow A1 in conjunction with the sleeve 71 and the opening/closing pin 71*a* is located at the unlocking portion 73*c* of the opening/closing guide hole 73L, as shown in FIG. 3C, the second side hook 70L becomes movable in a direction of the arrow H2 in which the second side hook 70L is spaced apart from the center hook 70C by such a predetermined amount that the wire W does not come off between the second side hook 70L and the center hook 70C.

The sleeve 71 has a bending portion 71*c*1 configured to form the wire W into a predetermined shape by pushing and bending a tip end side of the wire W, which is one end portion, in a predetermined direction. In addition, the sleeve 71 has a bending portion 71*c*2 configured to form the wire W into a predetermined shape by pushing and bending a terminal end side, which is the other end portion of the wire W cut by the cutting unit 6, in a predetermined direction. The bending portion 71*c*1 and the bending portion 71*c*2 are formed at an end portion of the sleeve 71 in the forward direction denoted with the arrow A1.

The sleeve 71 is moved in the forward direction denoted with the arrow A1, so that the tip end side of the wire W locked by the center hook 70C and the second side hook 70L is pushed and bent toward the reinforcing bars S by the bending portion 71*c*1. In addition, the sleeve 71 is moved in the forward direction denoted with the arrow A1, so that the terminal end side of the wire W locked by the center hook 70C and the first side hook 70R and cut by the cutting unit 6 is pushed and bent toward the reinforcing bars S by the bending portion 71*c*2.

The binding unit 7 includes a rotation regulation part 74 configured to regulate rotations of the locking member 70 and the sleeve 71 in conjunction with the rotating operation of the rotary shaft 72. The rotation regulation part 74 has a rotation regulation blade 74*a* provided to the sleeve 71, and a rotation regulation claw (not shown) to which the rotation regulation blade 74*a* is locked and which is provided to the main body part 10.

The rotation regulation blade 74*a* is configured by a plurality of convex portions protruding radially from an outer periphery of the sleeve 71 and provided with predetermined intervals in a circumferential direction of the sleeve 71. The rotation regulation blade 74*a* is fixed to the sleeve 71 and is configured to move and rotate integrally with the sleeve 71.

In an operation area in which the wire W is locked by the locking member 70, the wire W is wound on the reinforcing bars S and is cut and further the wire W is bent and shaped by the bending portions 71*c*1 and 71*c*2 of the sleeve 71, the rotation regulation blade 74*a* of the rotation regulation part 74 is locked. When the rotation regulation blade 74*a* is locked, the rotation of the sleeve 71 in conjunction with the rotation of the rotary shaft 72 is regulated, so that the sleeve 71 is moved in the front and rear direction by the rotating operation of the rotary shaft 72.

In addition, in an operation area in which the wire W locked by the locking member 70 is twisted, the rotation regulation blade 74*a* of the rotation regulation part 74 is unlocked. When the rotation regulation blade 74*a* is unlocked, the sleeve 71 is rotated in conjunction with the rotation of the rotary shaft 72. The center hook 70C, the first side hook 70R and the second side hook 70L of the locking member 70 locking the wire W are rotated in conjunction with the rotation of the sleeve 71. In an operation region of the sleeve 71 and the locking member 70 along the axis direction of the rotary shaft 72, an operation region in which the wire W is locked by the locking member 70 is referred to as a first operation area. In addition, an operation area in which the wire W locked by the locking member 70 is twisted is referred to as a second operation area.

The binding unit 7 includes a moving member 75 configured to actuate the transmission unit 9. The moving member 75 is rotatably attached to the sleeve 71, and is configured not to operate in conjunction with the rotation of the sleeve 71 and to be movable in the front and rear direction in conjunction with the sleeve 71.

The moving member 75 has an engaging portion 75*a* configured to engage with the cam 90 of the transmission unit 9. The engaging portion 75*a* is configured not to operate in conjunction with the rotation of the sleeve 71, and to move in the front and rear direction in conjunction with the sleeve 71.

Note that, as a modified embodiment of the opening/closing guide hole 73L provided in the second side hook 70L, in a modified embodiment shown in FIG. 3D, the opening/closing guide hole 73L may be configured to have a first locking portion 73*b*, an unlocking portion 73*c*, and a second locking portion 73*d*. The opening/closing guide hole 73L is formed with the first locking portion 73*b* on a downstream side of the opening/closing portion 73*a*, the unlocking portion 73*c* on a downstream side of the first locking portion 73*b*, and the second locking portion 73*d* on a downstream side of the unlocking portion 73*c*, with respect to the forward moving direction of the sleeve 71 denoted with the arrow A1.

The first locking portion 73*b* and the second locking portion 73*d* are formed in the inner wall surface of the opening/closing guide hole 73L facing toward the direction of the arrow H1, which is the direction in which the second side hook 70L is closed. The first locking portion 73*b* and the second locking portion 73*d* are configured to face the outer wall surface of the opening/closing guide hole 73L with a dimension substantially equivalent to the diameter of the opening/closing pin 71*a*, and extend in parallel to the outer wall surface.

The unlocking portion 73*c* is configured by providing the inner wall surface of the opening/closing guide hole 73L with a concave portion that is concave with respect to the first locking portion 73*b* and the second locking portion 73*b*. The unlocking portion 73*c* is configured to face the outer wall surface of the opening/closing guide hole 73L with a dimension slightly greater than the diameter of the opening/closing pin 71*a*, and extends in parallel to the outer wall surface.

In the modified embodiment shown in FIG. 3D, the second side hook 70L is configured to enable the opening/closing pin 71*a* to move along the inner wall surface of the opening/closing guide hole 73L by an operation of the opening/closing pin 71*a* moving in the direction of the arrow A1, and to lock the wire W in a state in which the wire W is not allowed to move, within a range in which the opening/closing pin 71*a* is located at the first locking portion 73*b* of the opening/closing guide hole 73L, as shown with the solid line.

On the other hand, within a range in which the opening/closing pin 71*a* is moved in the direction of the arrow A1 and the opening/closing pin 71*a* is located at the unlocking portion 73*c* of the opening/closing guide hole 73L, as shown with the dashed-two dotted line, the opening/closing guide hole 73L can be displaced up to a position denoted with the dashed-two dotted line, with respect to the opening/closing pin 71*a*, and the second side hook 70L becomes movable in the direction of the arrow H2 in which the second side hook 70L is spaced apart from the center hook 70C by such a predetermined amount that the wire W does not come off between the second side hook 70L and the center hook 70C.

Further, within a range in which the opening/closing pin 71*a* is moved in the direction of the arrow A1 and the opening/closing pin 71*a* is located at the second locking portion 73*d* of the opening/closing guide hole 73L, as shown with the broken line, the wire W is locked in a state in which the wire W is not allowed to move. Here, within the range in which the opening/closing pin 71*a* is located at the second locking portion 73*d* of the opening/closing guide hole 73L, an operation of twisting the wire W with the binding unit 7 is performed, as described later.

In a modified embodiment shown in FIG. 3E, the opening/closing guide hole 73L has a first locking portion 73*b*, an unlocking portion 73*c*, and a second locking portion 73*d*. The unlocking portion 73*c* is configured to face, at a portion connected to the first lock portion 73*b*, the outer wall surface of the opening/closing guide hole 73L with a dimension slightly greater than the diameter of the opening/closing pin 71*a*. In addition, the unlocking portion 73*c* is configured by an inclined surface inclined with respect to the outer wall surface, and is connected to the second lock portion 73*d*.

In the modified embodiment shown in FIG. 3E, the second side hook 70L is configured to enable the opening/closing pin 71*a* to move along the inner wall surface of the opening/closing guide hole 73L by an operation of the opening/closing pin 71*a* moving in the direction of the arrow A1, and to lock the wire W in a state in which the wire W is not allowed to move, within a range in which the opening/closing pin 71*a* is located at the first locking portion 73*b* of the opening/closing guide hole 73L, as shown with the solid line.

On the other hand, within a range in which the opening/closing pin 71*a* is moved in the direction of the arrow A1 and the opening/closing pin 71*a* is located at the unlocking portion 73*c* of the opening/closing guide hole 73L, as shown with the dashed-two dotted line, the opening/closing guide hole 73L can be displaced up to a position denoted with the dashed-two dotted line, with respect to the opening/closing pin 71*a*, and the second side hook 70L becomes movable in the direction of the arrow H2 in which the second side hook 70L is spaced apart from the center hook 70C by such a predetermined amount that the wire W does not come off between the second side hook 70L and the center hook 70C. In addition, within a range in which the opening/closing pin 71*a* is located at the unlocking portion 73*c* of the opening/closing guide hole 73L, as the opening/closing pin 71*a* comes closer to the second locking portion 73*d*, a movable amount in the direction in which the second side hook 70L is spaced apart from the center hook 70C becomes smaller.

Further, within a range in which the opening/closing pin 71*a* is moved in the direction of the arrow A1 and the opening/closing pin 71*a* is located at the second locking portion 73*d* of the opening/closing guide hole 73L, as shown with the broken line, the wire W is locked in a state in which the wire W is not allowed to move.

In a modified example shown in FIG. 3F, the opening/closing guide hole 73L has a first locking portion 73*b*, an unlocking portion 73*c*, and a second locking portion 73*d*. The unlocking portion 73*c* is configured to face, at a portion connected to the first lock portion 73*b*, the outer wall surface of the opening/closing guide hole 73L with a dimension slightly greater than the diameter of the opening/closing pin 71*a*. In addition, the unlocking portion 73*c* is configured by an inclined surface inclined with respect to the outer wall surface, and is connected to the second lock portion 73*d*.

The second locking portion 73*d* is configured by an inclined surface connected to the unlocking portion 73*c*. The second locking portion 73*d* is configured such that an interval between the inner wall surface and the outer wall surface of the opening/closing guide hole 73L becomes smaller toward the front side of the opening/closing guide hole 73L and the inner wall surface and the outer wall surface at an end portion on the front side of the opening/closing guide hole 73L face each other with a dimension substantially equivalent to the diameter of the opening/closing pin 71*a*.

In the modified embodiment shown in FIG. 3F, the second side hook 70L is configured to enable the opening/closing pin 71*a* to move along the inner wall surface of the opening/closing guide hole 73L by an operation of the opening/closing pin 71*a* moving in the direction of the arrow A1, and to lock the wire W in a state in which the wire W is not allowed to move, within a range in which the opening/closing pin 71*a* is located at the first locking portion 73*b* of the opening/closing guide hole 73L, as shown with the solid line.

On the other hand, within a range in which the opening/closing pin 71*a* is moved in the direction of the arrow A1 and the opening/closing pin 71*a* is located at the unlocking portion 73*c* of the opening/closing guide hole 73L, as shown with the dashed-two dotted line, the opening/closing guide hole 73L can be displaced up to a position denoted with the dashed-two dotted line, with respect to the opening/closing pin 71*a*, and the second side hook 70L becomes movable in the direction of the arrow H2 in which the second side hook 70L is spaced apart from the center hook 70C by such a predetermined amount that the wire W does not come off between the second side hook 70L and the center hook 70C. In addition, within a range in which the opening/closing pin 71*a* is located at the unlocking portion 73*c* of the opening/closing guide hole 73L, as the opening/closing pin 71*a* comes closer to the second locking portion 73*d*, a movable amount in the direction in which the second side hook 70L is spaced apart from the center hook 70C becomes smaller.

Further, within a range in which the opening/closing pin 71*a* is moved in the direction of the arrow A1 and the opening/closing pin 71*a* is located at the second locking portion 73*d* of the opening/closing guide hole 73L, as shown with the broken line, the wire W is locked in a state in which the wire W is not allowed to move.

Example of Embodiment of Cutting Unit

Figure 4A:
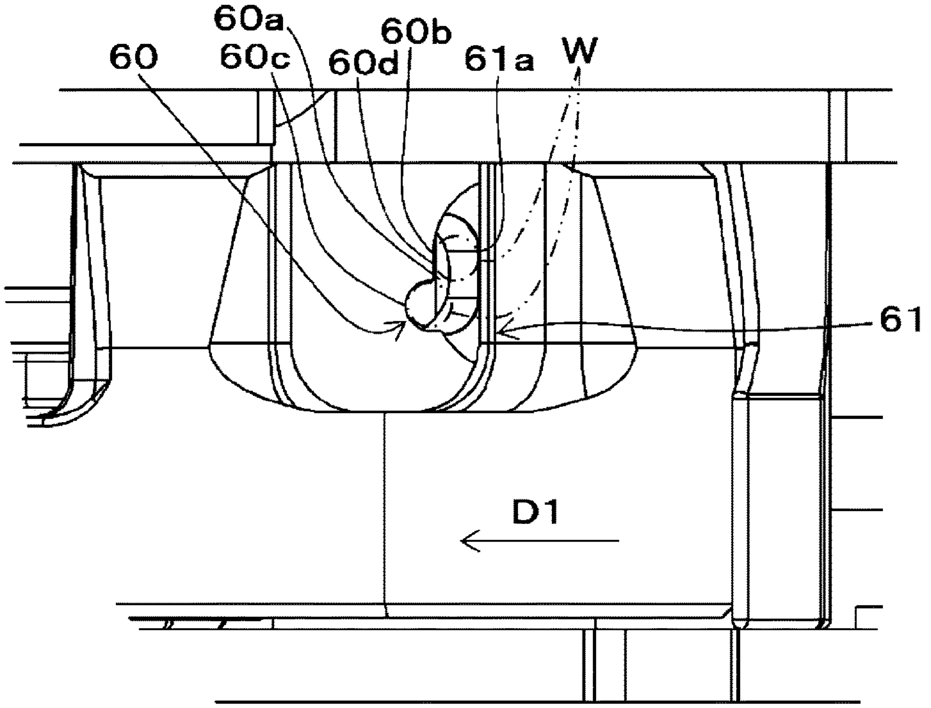
FIG. 4A is a plan view showing an example of a cutting unit according to the present embodiment.
Figure 4B:
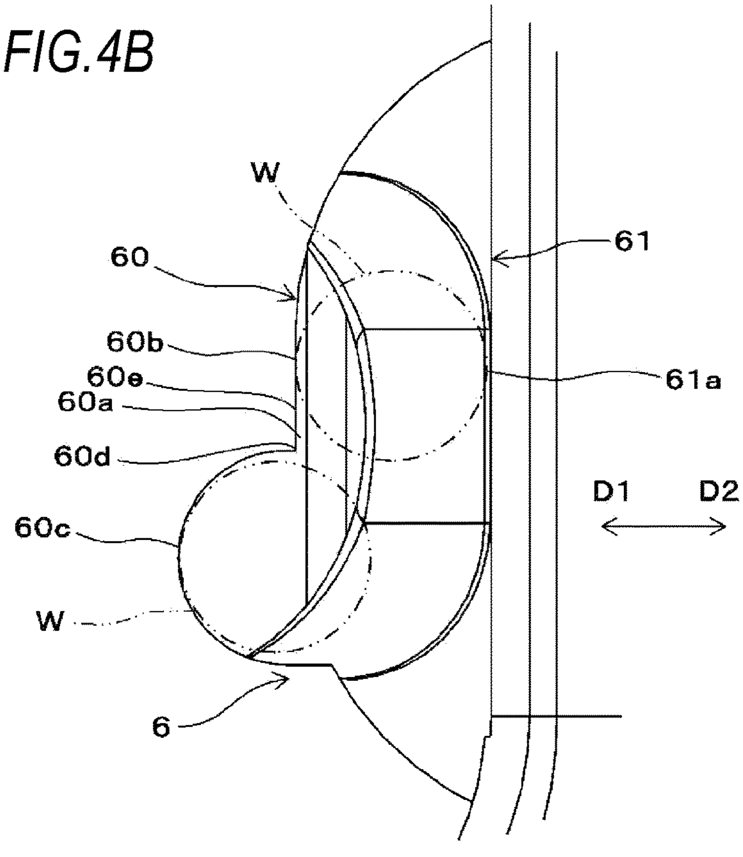
FIG. 4B is a plan view showing the example of the cutting unit according to the present embodiment.
Figure 4C:
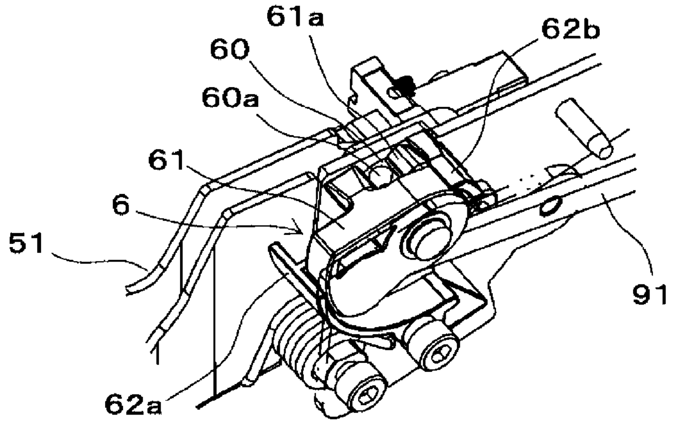
FIG. 4C is a perspective view showing the example of the cutting unit of the present embodiment.
Figure 4D:
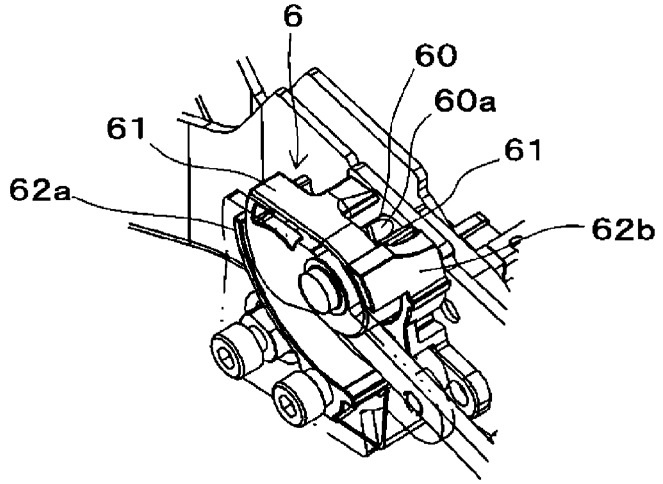
FIG. 4D is a perspective view showing the example of the cutting unit of the present embodiment.
Figure 4E:
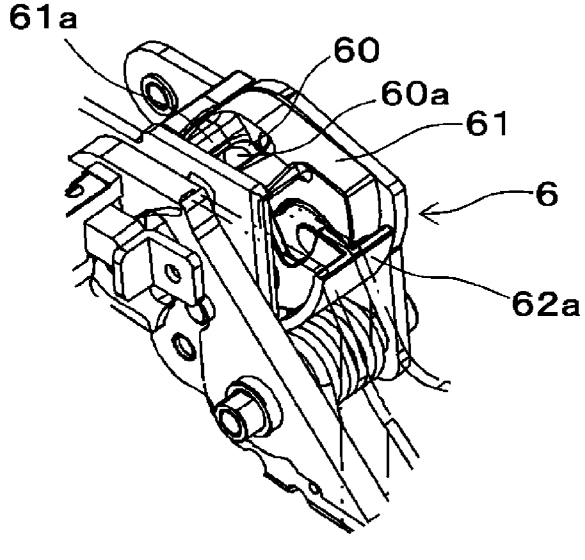
FIG. 4E is a perspective view showing the example of the cutting unit of the present embodiment.
Figure 4F:
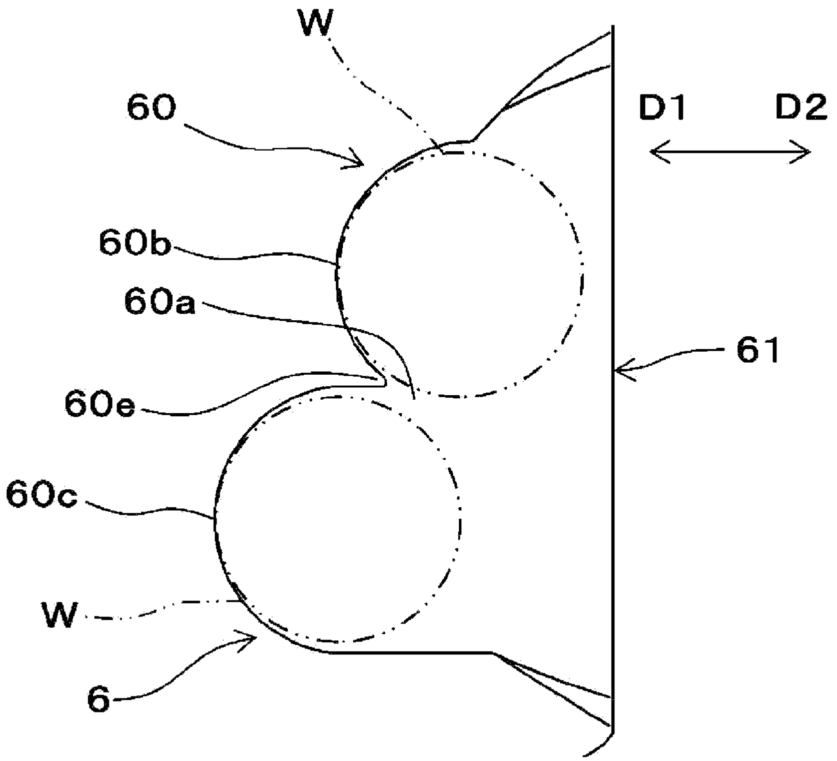
FIG. 4F is a plan view showing a modified embodiment of the cutting unit according to the present embodiment.
Figure 4G:
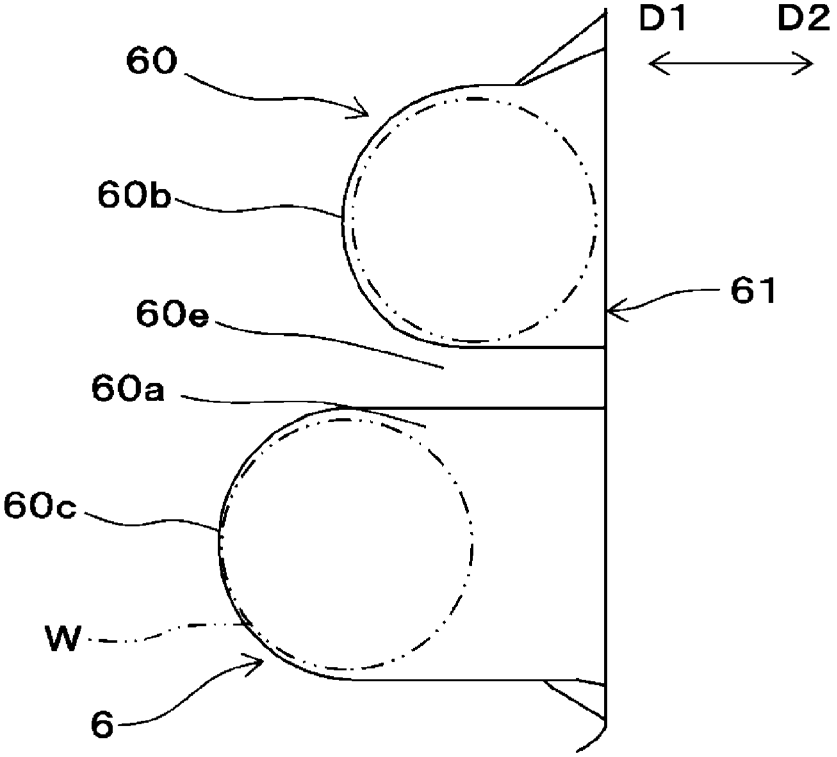
FIG. 4G is a plan view showing a modified embodiment of the cutting unit according to the present embodiment.

FIGS. 4A and 4B are plan views showing an example of the cutting unit of the present embodiment, FIGS. 4C to 4E are perspective views showing the example of the cutting unit of the present embodiment, and FIGS. 4F and 4G are plan views showing modified embodiments of the cutting unit of the present embodiment. Next, an example of the cutting unit of the present embodiment will be described with reference to each drawing.

The fixed blade part 60 is an example of the blade part, has a cylindrical shape serving as an axis of rotation of the movable blade part 61, and is provided with an opening 60*a* penetrating in a radial direction of the cylindrical shape along the feeding path of the wire W. The opening 60*a* has a shape through which the wire W can pass. In the configuration in which the reinforcing bars S are bound with the two wires W, a cross-sectional shape of the opening 60*a* is a long hole shape along a direction in which the two wires W are aligned in parallel.

Preferably, the opening 60*a* has, for example, a tapered shape in which opening areas on an introduction side and a discharge side of the opening 60*a* are widened with respect to the feeding of the wire W in the forward direction denoted with the arrow F. The fixed blade part 60 is provided on a downstream side of the wire guide 4 with respect to the feeding direction of the wire W that is conveyed in the forward direction.

In the configuration in which the reinforcing bars S are bound with the two wires W, the fixed blade part 60 has a first butting portion 60*b* and a second butting portion 60*c* at an end portion of the opening 60*a* exposed on a circumferential surface on which the movable blade part 61 slides. The fixed blade part 60 is provided with a plurality of butting portions in a direction in which a plurality of wires W are aligned in parallel, and in the present example, is provided with the first butting portion 60*b*, which is one butting portion, and the second butting portion 60*c*, which is the other butting portion, along the direction in which the two wires W are aligned in parallel.

The fixed blade part 60 is provided with the first butting portion 60*b* on a front side and the second butting portion 60*c* on an inner side, with respect to a moving direction of the movable blade part 61 denoted with an arrow D1. The fixed blade part 60 has a step portion 60*d* formed between the first butting portion 60*b* and the second butting portion 60*c* by recessing the second butting portion 60*c* with respect to the moving direction of the movable blade part 61 denoted with the arrow D1. A recessed amount is preferably about a half of the diameter of the wire W.

The fixed blade part 60 has a regulation portion 60*e* configured to suppress the wire W butted against the first butting portion 60*b* from moving in a direction of the second butting portion 60*c*. The regulation portion 60*e* is a planar surface extending in a direction substantially orthogonal to the moving direction of the movable blade part 61 denoted with the arrow D1, and is provided between the first butting portion 60*b* and the step portion 60*d*.

The movable blade part 61 is an example of the blade part, has a shape of sliding along the circumferential surface of the fixed blade part 60, and is configured to be in sliding contact with an open end of the opening 60*a* of the fixed blade part 60 by a rotating operation about the fixed blade part 60 serving as a fulcrum shaft.

The cutting unit 6 has wall portions 62*a* and 62*b* configured to regulate introduction of foreign matters. The wall portions 62*a* and 62*b* are provided on upstream and downstream sides along a locus of the rotating operation of the movable blade part 61, with respect to the opening 60*a* of the fixed blade part 60. The wall portions 62*a* and 62*b* each have a shape following the locus of the rotating operation of the movable blade part 61 about the fixed blade part 60 serving as a fulcrum, and are configured to suppress foreign matters, such as wastes entering from an opening at a front end of the main body part 10 and shavings resulting from rubbing of the wire W and the reinforcing bar S, from entering the periphery of the movable blade part 61. Thereby, it is possible to suppress a malfunction of the movable blade part 61 and an increase in load for rotating the movable blade part 61.

As for the cutting unit 6, when the movable blade part 61 is rotated in the direction of the arrow D1 from an initial position, the wire W having passed through the opening 60*a* of the fixed blade part 60 is pressed against the open end of the opening 60*a* by the movable blade part 61. One wire W of the two wires W aligned in parallel is pressed against an end edge portion of the first butting portion 60*b* of the fixed blade part 60 by the operation of the movable blade part 61, and the other wire W is introduced into the second butting portion 60*c* of the fixed blade part 60. Thereby, a shearing force is applied to one wire W, and cutting of the one wire W is started prior to the other wire W.

When the movable blade part 61 is rotated in the direction of the arrow D1 to start cutting of the first wire W, which is one wire, and the first wire W is cut to a predetermined position, the second wire W, which is the other wire, is pressed against an end edge portion of the second butting portion 60*c* of the fixed blade part 60 by the operation of the movable blade part 61.

Thereby, cutting of the second wire W is started. Preferably, the shapes and positions of the first butting portion 60*b* and the second butting portion 60*c* are set so that, after starting the cutting of the first wire W, when the first wire W is cut in half or more in the radial direction, cutting of the second wire W is started. That is, a distance from the end edge portion of the first butting portion 60*b* to the end edge portion of the second butting portion 60*c* along the rotation direction of the movable blade part 61 denoted with the arrow D1 is set to be a substantial half of the wire W in the radial direction.

When the movable blade part 61 is further rotated in the direction of the arrow D1, the cutting of the one wire W for which cutting has been started first is completed. When the movable blade part 61 is further rotated to a cutting completion position in the direction of arrow D1, the cutting of the other wire W for which cutting has been started later is completed.

The fixed blade part 60 has the regulation portion 60*e* formed between the first butting portion 60*b* and the second butting portion 60*c* and having a planar surface extending in a direction substantially orthogonal to the moving direction of the movable blade part 61 denoted with the arrow D1. Due to the planar surface, when the movable blade part 61 is moved in the direction of the arrow D1, it is possible to prevent an unintended force from acting on the wire W in the direction substantially orthogonal to the moving direction.

Thereby, the wire W butted against the first butting portion 60*b* by the movable blade part 61 is suppressed from moving to the direction of the second butting portion 60*c*. In addition, the wire W is suppressed from moving in the direction of the second butting portion 60*c*, so that wear of the step portion 60*d* is suppressed and a difference in distance from the end edge portion of the first butting portion 60*b* to the end edge portion of the second butting portion 60*c* along the rotation direction of the movable blade part 61 denoted with the arrow D1 is suppressed from decreasing. Therefore, it is possible to secure a phase difference of timings at which the cuttings of the two wires W are started, and to suppress an increase in load, which is caused when the cuttings of the two wires W are started at substantially the same time.

Note that, the regulation portion 60*e* may be configured by providing the planar surface, which extends in the direction substantially orthogonal to the moving direction of the movable blade part 61 denoted with the arrow D1, at a part between the first butting portion 60*b* and the step portion 60*d*. In addition, the regulation portion 60*e* may be configured by an inclined surface or a curved surface where the step portion 60*d* protrudes from the first butting portion 60*b* toward the second butting portion 60*c* along a direction (arrow D2) opposite to the moving direction of the movable blade part 61 denoted with the arrow D1.

Further, as shown in FIG. 4F, the regulation portion 60*e* may be configured by a convex portion protruding from the first butting portion 60*b* and the second butting portion 60*c* along the direction (arrow D2) opposite to the moving direction of the movable blade part 61 denoted with the arrow D1, between the first butting portion 60*b* and the second butting portion 60*c*. Thereby, the first butting portion 60*b* becomes a concave shape, so that the wire W butted against the first butting portion 60*b* by the movable blade part 61 is suppressed from moving in the direction of the second butting portion 60*c*.

Further, as shown in FIG. 4G, the regulation portion 60*e* may be formed into a shape of partitioning the first butting portion 60*b* and the second butting portion 60*c* therebetween. Thereby, the first butting portion 60*b* and the second butting portion 60*c* are made independent, so that the wire W butted against the first butting portion 60*b* by the movable blade part 61 is suppressed from moving in the direction of the second butting portion 60*c*.

Example of Embodiment of Transmission Unit

Next, an example of the transmission unit 9 of the present embodiment will be described with reference to each drawing. The transmission unit 9 is supported so that the cam 90 can rotate about a shaft 90*a* as a fulcrum. The shaft 90*a* is attached to a frame 10*a* attached to an interior of the main body part 10. The frame 10*a* has a guide portion 10*b* configured to regulate a moving direction of a link 91. The guide portion 10*b* is configured by a long hole penetrating through the plate-shaped frame 10*a*.

The cam 90 is an example of the displacement member, and has a cam groove 92 whose length from the shaft 90*a* is displaced. The cam groove 92 extends in radial and circumferential directions of the cam 90 about the shaft 90*a*, and intersects the guide portion 10*b* of the frame 10*a*. The cam groove 92 penetrates through the plate-shaped cam 90, so that an intersection of the cam groove 90 and the guide portion 10*b* communicates.

The cam 90 is configured such that a rotating operation about the shaft 90*a* as a fulcrum changes a portion of the cam groove 92 intersecting the guide portion 10*b*, thereby changing a length from the shaft 90*a* to the intersection of the cam groove 92 and the guide portion 10*b*.

For the cam 90, ranges in which an amount of change in length between the shaft 90*a* and the cam groove 92 by the rotating operation about the shaft 90*a* as a fulcrum is large and small for the same amount of rotation of the cam 90 are set. In the present example, a first range 92*a* in which the amount of change in length between the shaft 90*a* and the cam groove 92 is the largest, a second range 92*b* in which the amount of change in length between the shaft 90*a* and the cam groove 92 is smaller than the first range 92*a*, and a third range 92*c* in which there is little amount of change in length between the shaft 90*a* and the cam groove 92 are provided.

The cam 90 is configured such that, while the first range 92*a* of the cam groove 92 intersects the guide portion 10*b* by the rotating operation in the direction of the arrow C1 about the shaft 90*a* as a fulcrum, the length from the shaft 90*a* to the intersection of the cam groove 92 and the guide portion 10*b* is shorter and the amount of change in length between the shaft 90*a* and the cam groove 92 becomes larger, as compared with a case where the second range 92*b* intersects the guide portion 10*b*.

In addition, the cam 90 is configured such that, while the second range 92*b* of the cam groove 92 intersects the guide portion 10*b* by the rotating operation in the direction of the arrow C1 about the shaft 90*a* as a fulcrum, the length from the shaft 90*a* to the intersection of the cam groove 92 and the guide portion 10*b* is longer and the amount of change in length between the shaft 90*a* and the cam groove 92 becomes smaller, as compared with the case where the first range 92*a* intersects the guide portion 10*b*.

Further, the cam 90 is configured such that, while the third range 92*c* of the cam groove 92 intersects the guide portion 10*b* by the rotating operation in the direction of the arrow C1 about the shaft 90*a* as a fulcrum, the length from the shaft 90*a* to the intersection of the cam groove 92 and the guide portion 10*b* is substantially equivalent and the amount of change in length between the shaft 90*a* and the cam groove 92 is further smaller and substantially constant, as compared with the case where the second range 92*b* intersects the guide portion 10*b*.

The cam 90 has an engaged portion 93 to which movement of the sleeve 71 is transmitted via the moving member 75. The engaged portion 93 is provided on an opposite side to the cam groove 92 with the shaft 90*a* interposed therebetween, and is arranged on a locus of the engaging portion 75*a* by the movement of the moving member 75 in conjunction with the movement of the sleeve 71 in the front and rear direction denoted with the arrows A1 and A2. The engaged portion 93 is engaged with the engaging portion 75*a* of the moving member 75 by an operation in which the sleeve 71 is moved in the forward direction denoted with the arrow A1.

The cam 90 is urged by a spring 94 in the direction of the arrow C2 in which the first range 92*a* of the cam groove 92 intersects the guide portion 10*b* by the rotating operation about the shaft 90*a* as a fulcrum. The spring 94 is configured by, for example, a torsion coil spring attached to the shaft 90*a*. Note that, the rotation direction of the cam 90 denoted with the arrow C2 corresponds to a direction in which the movable blade part 61 connected by the link 91 returns from the cutting completion position to the initial position. In consideration of a case in which the cam 90 cannot rotate in the direction of the arrow C2 with the force of the spring 94 by the operation of the movable blade part 61 returning from the cutting completion position to the initial position, the moving member 75 is provided with a pressing convex portion 76 and the cam 90 is provided with a pressed convex portion 96. When the moving member 75 is moved in the direction of the arrow A1 direction and the cam 90 is rotated until the movable blade part 61 is rotated to the cutting completion position, the pressing convex portion 76 and the pressed convex portion 96 face. By the operation of the sleeve 71 moving in the direction of the arrow A2, the pressing convex portion 76 pushes the pressed convex portion 96, so that the cam 90 can be forced to start rotating in the direction of the arrow C2.

The link 91 is an example of the transmission member, and has an end portion in the forward direction denoted with the arrow A1 connected to the movable blade part 61, and an end portion in the backward direction denoted with the arrow A2 connected to the cam 90. The link 91 has a shaft portion 91*a* configured to enter the cam groove 92 of the cam 90 and the guide portion 10*b* of the frame 10*a*. The shaft portion 91*a* is configured by a rotary body 91*a*1 configured to enter the cam groove 92, and a shaft 91*a*2 configured to rotatably support the rotary body 91*a*1 and to be non-rotatable with respect to the link 91 that enters the guide portion 10*b*, and is inserted into the cam groove 92 and the guide portion 10*b* at the intersection of the cam groove 92 and the guide portion 10*b*. The shaft portion 91*a* is configured to move along the cam groove 92 and the guide portion 10*b* by the rotating operation of the cam 90 about the shaft 90*a* as a fulcrum. Here, by the rotating operation of the cam 90 about the shaft 90*a* as a fulcrum, a force that is applied in a circumferential direction of the rotary body 91*a*1 as the cam groove 92 and the rotary body 91*a*1 are slid and a force that is applied in a circumferential direction of the shaft 91*a*2 as the guide portion 10*b* and the shaft 91*a*2 are slid become forces in opposite directions. Therefore, in the shaft portion 91*a*, the rotary body 91*a*1 and the shaft 91*a*2 are configured as separate components. Note that, the shaft portion 91*a* may have a first rotary body configured to enter the cam groove 92, a second rotary body configured to enter the guide portion 10*b*, and a shaft configured to rotatably support the first rotary body and the second rotary body.

When the sleeve 71 is moved in the forward direction denoted with the arrow A1, the moving member 75 is moved in the forward direction denoted with the arrow A1 in conjunction with the sleeve 71. The moving member 75 is configured such that the engaging portion 75*a* is engaged with the engaged portion 93 of the cam 90 by the moving operation in the forward direction denoted with the arrow A1.

When the moving member 75 is further moved in the forward direction denoted with the arrow A1, the engaged portion 93 is pushed forward, so that the cam 90 is rotated in the direction of the arrow C1 about the shaft 90*a* as a fulcrum. When the cam 90 is rotated in the direction of the arrow C1, a portion of the cam groove 92 intersecting the guide portion 10*b* changes, and the length from the shaft 90*a* to the intersection of the cam groove 92 and the guide portion 10*b* changes in an increasing direction.

Thereby, when the cam 90 is rotated in the direction of the arrow C1 and the shaft portion 91*a* of the link 91 is moved along the cam groove 92 and the guide portion 10*b*, the shaft portion 91*a* is moved in a direction away from the shaft 90*a* of the cam 90.

The transmission unit 9 is configured such that, when the shaft portion 91*a* of the link 91 is moved in the direction away from the shaft 90*a* of the cam 90, the rotating operation of the cam 90 is converted into movement along the extension direction of the link 91.

Thereby, the rotating operation of the cam 90 is transmitted to the movable blade part 61 via the link 91, so that the movable blade part 61 is rotated in the direction of the arrow D1. Therefore, the moving operation of the sleeve 71 in the forward direction rotates the movable blade part 61 in a predetermined direction to cut the wire W.

A period during which the first range 92*a* of the cam groove 92 intersects the guide portion 10*b* corresponds to a period after the movable blade part 61 of the cutting unit 6 starts rotation until the cutting of the first wire W is started. The period until the cutting of the first wire W is started corresponds to a region in which a load is low.

In addition, a period during which the second range 92*b* of the cam groove 92 intersects the guide portion 10*b* corresponds to a period after the movable blade part 61 of the cutting unit 6 rotates and the cutting of the first wire W is started until the cutting of the second wire W ends. The period after the cutting of the first wire W is started until the cutting of the second wire W ends corresponds to a region in which a load is high. Further, a period during which the third range 92*c* of the cam groove 92 intersects the guide portion 10*b* corresponds to a period during which the cutting of the second wire W ends and the rotation of the movable blade part 61 stops. In this way, with respect to the amount of movement of the moving member 75, it is not necessary to rotate the cutter having completed the wire cutting operation more than necessary.

Note that, in the above embodiment, the cam 90 has such a configuration that the length from the intersection of the cam groove 92, which is a first connection portion connected to the link 91, and the guide portion 10*b* to the shaft 90*a* is switched by the rotating operation about the shaft 90*a* as a fulcrum due to the shape of the cam groove 92.

Thereby, the cam 90 makes it possible to switch the amount of rotation (amount of movement) of the movable blade part 61 and the force that can be generated by the movable blade part 61, within the rotating range (moving range) of the movable blade part 61.

On the other hand, the cam 90 may be configured such that a length from the engaged portion 93, which is a second connection portion connected to the sleeve 71, to the shaft 90*a* is switched by the rotating operation about the shaft 90*a* as a fulcrum.

Example of Embodiment of Decelerator

Figure 5A:
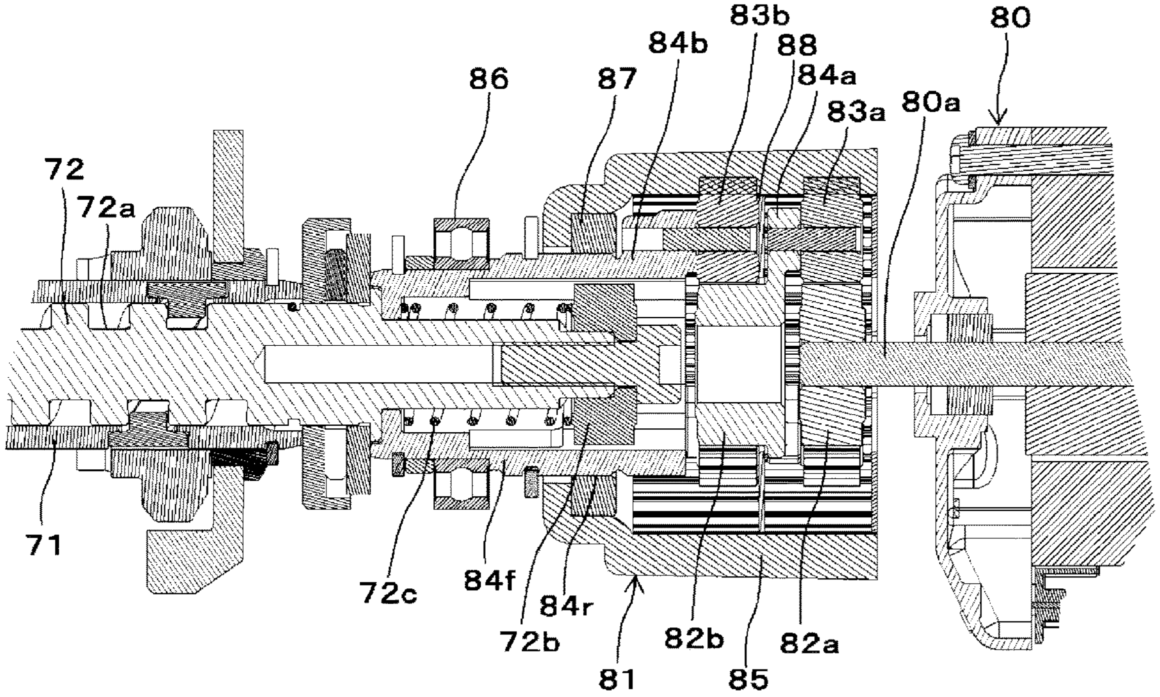
FIG. 5A is a side cross-sectional view showing an example of a decelerator according to the present embodiment.
Figure 5B:
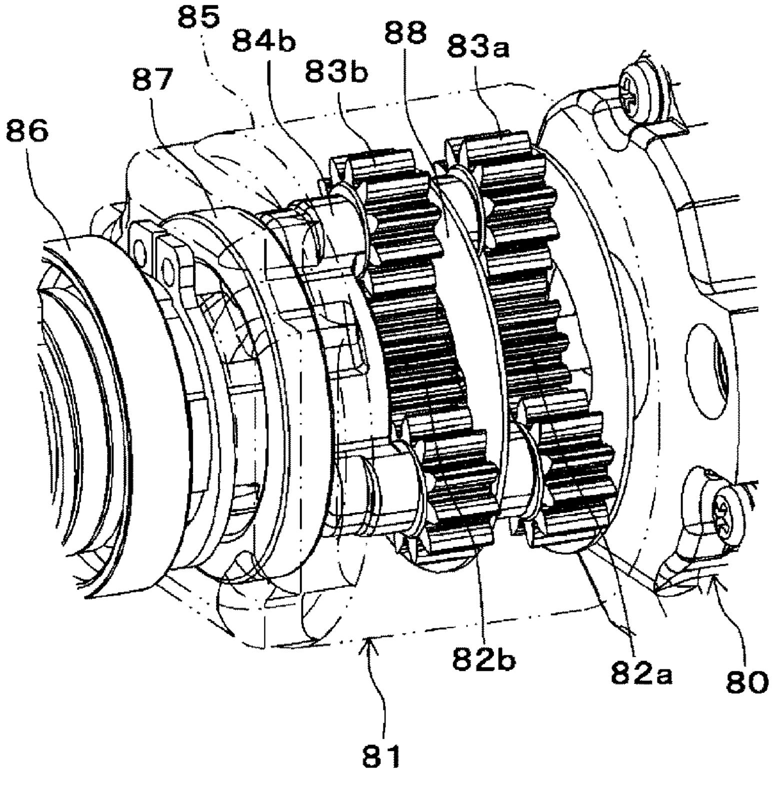
FIG. 5B is a perspective view showing the example of the decelerator according to the present embodiment.
Figure 5C:
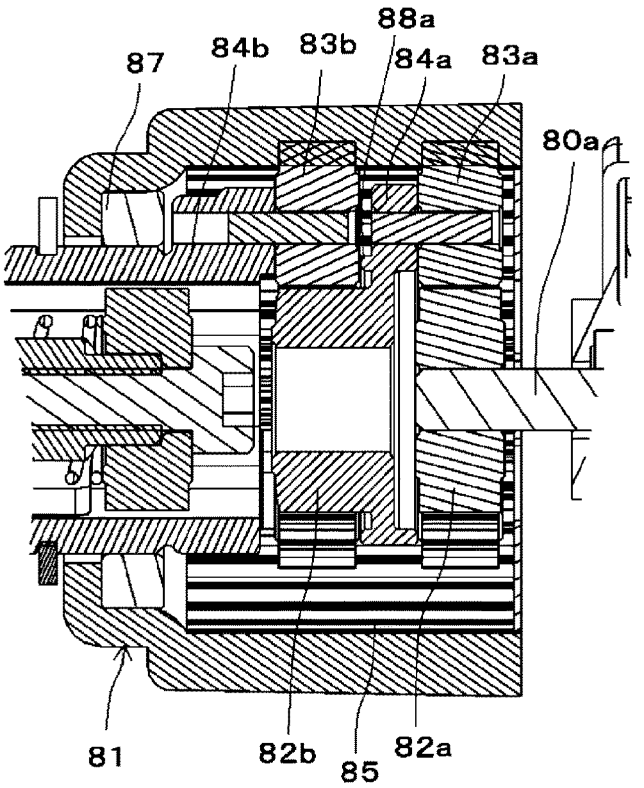
FIG. 5C is a side cross-sectional view of main parts showing a modified embodiment of the decelerator according to the present embodiment.
Figure 5D:
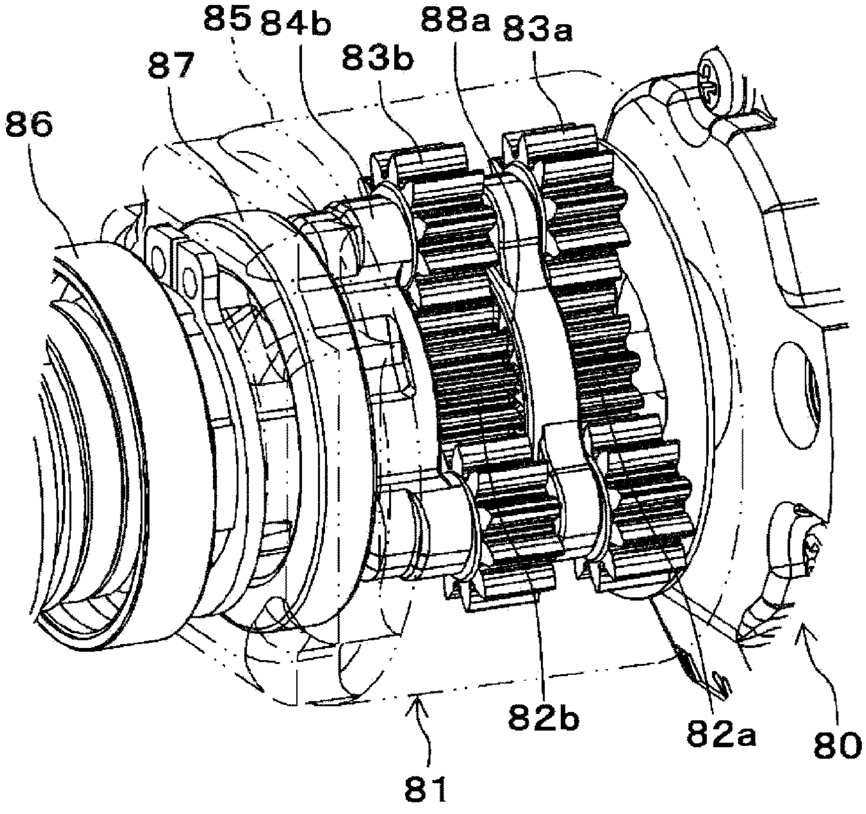
FIG. 5D is a perspective view showing the modified embodiment of the decelerator according to the present embodiment.
Figure 6A:
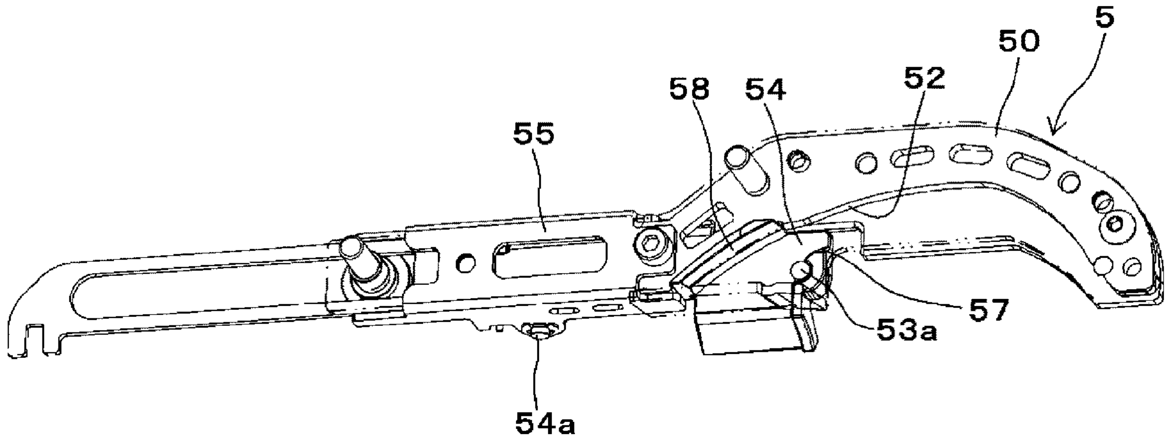
FIG. 6A is a plan view showing an example of a curl forming unit according to the present embodiment.
Figure 6B:
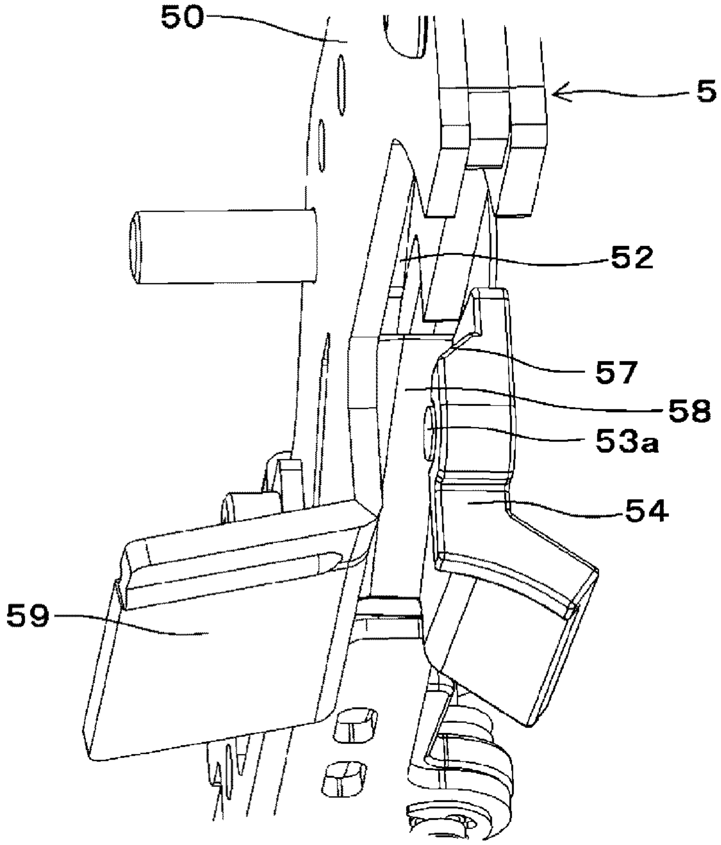
FIG. 6B is a plan view showing the example of the curl forming unit according to the present embodiment.
Figure 6C:
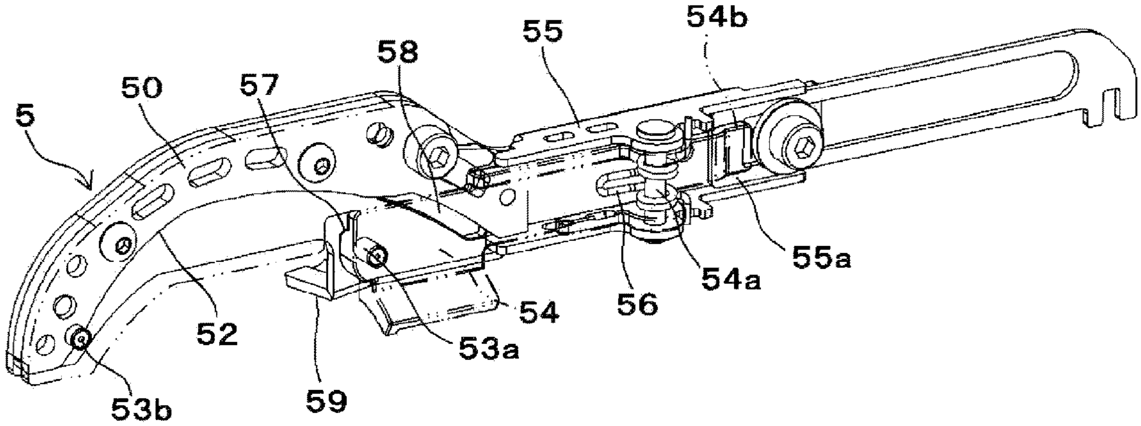
FIG. 6C is a plan view showing the example of the curl forming unit according to the present embodiment.
Figure 6D:
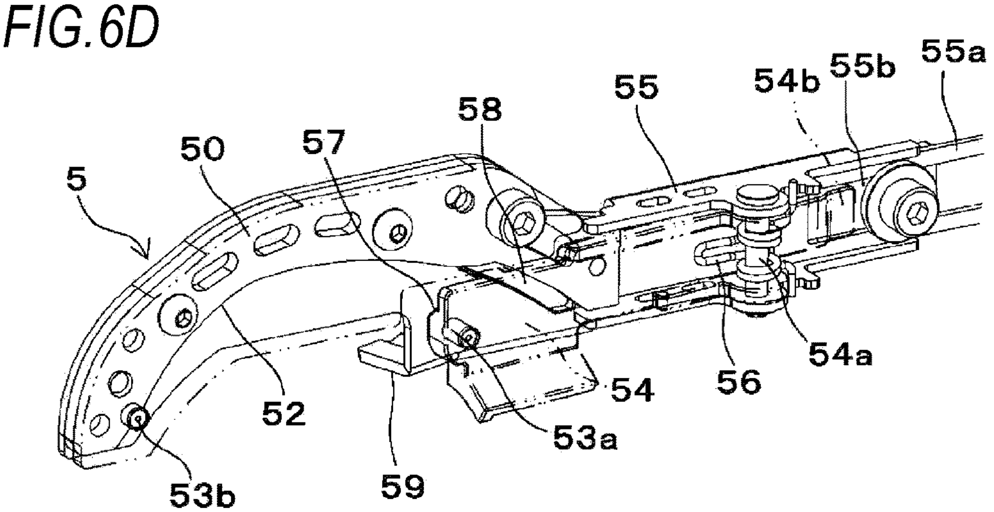
FIG. 6D is a plan view showing the example of the curl forming unit according to the present embodiment.

FIG. 5A is a side cross-sectional view showing an example of the decelerator of the present embodiment, FIG. 5B is a perspective view showing the example of the decelerator of the present embodiment, FIG. 5C is a side cross-sectional view of main parts showing a modified embodiment of the decelerator of the present embodiment, and FIG. 5D is a perspective view showing the modified embodiment of the decelerator of the present embodiment. Next, an example of the decelerator of the present embodiment will be described with reference to each drawing.

The decelerator 81 is configured by a planet gear in which an input shaft and an output shaft are coaxially arrayed, and includes a first sun gear 82*a* attached to a shaft 80*a* of a motor 80 serving as an input shaft, a first planetary gear 83*a* in mesh with the first sun gear 82*a* and a first planet cage 84*a* configured to support the first planetary gear 83*a*.

In addition, the decelerator 81 includes a second sun gear 82*b* provided to the first planet cage 84*a*, a second planetary gear 83*b* in mesh with the second sun gear 82*b*, and a second planet cage 84*b* configured to support the second planetary gear 83*b*.

Further, the decelerator 81 includes an internal gear 85 in mesh with the first planetary gear 83*a* and the second planetary gear 83*b*.

As for the decelerator 81, the internal gear 85 is fixed to the main body part 10. In addition, as for the decelerator 81, the first planet cage 84*a* and the second planet cage 84*b* are arranged coaxially with the shaft 80*a* of the motor 80. Further, as for the decelerator 81, the second planet cage 84*b* is connected to the rotary shaft 72, and configures an output shaft.

As for the decelerator 81, a front side portion 84*f* that is one side along an axis direction of the second planet cage 84*b* protrudes from the internal gear 85. As for the second planet cage 84*b*, the front side portion 84*f* protruding from the internal gear 85 is rotatably supported by the main body part 10 via a bearing 86.

In addition, as for the second planet cage 84*b*, a rear side portion 84*r* that is the other side along the axis direction is located inside the internal gear 85, and the rear side portion 84*r* is supported to the internal gear 85 by a support member 87. Since the internal gear 85 is fixed to the main body part 10, the rear side portion 84*r* of the second planet cage 84*b* is supported by the main body part 10 via the support member 87 configuring a sliding bearing and the internal gear 85. Note that, the support member 87 may be configured by a bearing.

Further, the decelerator 81 includes a gear holder 88 between the first planet cage 84*a* and the second planetary gear 83*b*. The gear holder 88 is configured by a disk-shaped member having a hole perforated at a center into which the second sun gear 82*b* is inserted, and is inserted between the first planet cage 84*a* and the second planetary gear 83*b* outside the second sun gear 82*b*, thereby securing a gap between the first planet cage 84*a* and the second planetary gear 83*b*.

Thereby, the second planet cage 84*b* is supported at the front side portion 84*f* and the rear side portion 84*r* along the axis direction by the main body part 10. Therefore, with a simple configuration, the second planet cage 84*b* is suppressed from being inclined with respect to the axis direction, and changes in meshes between the sun gear and the planetary gear and between the planetary gear and the internal gear, and interferences between gears aligned in parallel in the axis direction, between a gear and a planet cage, and the like are suppressed.

Note that, like the decelerator 81 of a modified embodiment shown in FIGS. 5C and 5D, the gear holder 88*a* may be provided integrally with the first planet cage 84*a*. The gear holder 88*a* is configured such that a disk-shaped member having a hole perforated at a center into which the second sun gear 82*b* is inserted is provided integrally with the first planet cage 84*a* outside the second sun gear 82*b*. Thereby, the gear holder 88*a* is inserted between the first planet cage 84*a* and the second planetary gear 83*b* outside the second sun gear 82*b*, thereby securing a gap between the first planet cage 84*a* and the second planetary gear 83*b*.

Example of Embodiment of Curl Forming Unit

FIGS. 6A to 6D are plan views showing an example of the curl forming unit of the present embodiment. Next, an example of the curl forming unit of the present embodiment will be described with reference to each drawing.

The curl forming unit 5 includes a guide groove 52 configuring a feeding path of the wire W in the curl forming unit 5, and a first guide member 53*a* and a second guide member 53*b*, which are configured to curl the wire W in cooperation with the guide groove 52.

The first guide member 53*a* is provided on an introduction part side of the curl guide 50 for the wire W that is fed in the forward direction by the wire feeding unit 3, and is arranged on a radially inner side of the loop Ru formed by the wire W with respect to the feeding path of the wire W by the guide groove 52. The first guide member 53*a* is configured to regulate the feeding path of the wire W so that the wire W fed along the guide groove 52 does not enter the radially inner side of the loop Ru formed by the wire W.

The second guide member 53*b* is provided on a discharge part side of the curl guide 50 for the wire W that is fed in the forward direction by the wire feeding unit 3, and is arranged on a radially outer side of the loop Ru formed by the wire W with respect to the feeding path of the wire W by the guide groove 52.

The curl forming unit 5 includes a retraction mechanism 54 configured to retract the first guide member 53*a* from the feeding path of the wire W. The retraction mechanism 54 is attached to a frame 55 for fixing the curl guide 50 to the main body part 10 so as to be rotatable about a shaft 54*a* as a fulcrum, and is configured to be displaced in directions in which the first guide member 53*a* protrudes and retracts with respect to the feeding path of the wire W.

The retraction mechanism 54 is urged by an urging member 56 such as a spring, in the direction in which the first guide member 53*a* protrudes to the feeding path of the wire W.

In addition, the retraction mechanism 54 includes an induction part 57 configured to displace the retraction mechanism 54 in the direction in which the first guide member 53*a* retracts with respect to the feeding path of the wire W. The induction part 57 is configured by an inclined surface configured, in an operation of winding the wire W on the reinforcing bars S, to be pushed by the wire W, thereby generating a force for displacing the retraction mechanism 54 in the direction in which the first guide member 53*a* retracts with respect to the feeding path of the wire W.

In addition, the retraction mechanism 54 includes a wire guide part 58 configuring a part of the guide groove 52. When the retraction mechanism 54 is moved in the direction in which the first guide member 53*a* protrudes with respect to the feeding path of the wire W, the wire guide part 58 protrudes to the feeding path of the wire W, and configures a part of the guide groove 52. In addition, when the retraction mechanism 54 is moved in the direction in which the first guide member 53*a* retracts with respect to the feeding path of the wire W, the wire guide part 58 protrudes to the feeding path of the wire W, and closes a path along which the wire W is exposed to an outside of the guide groove 52.

The curl forming unit 5 includes a feeding regulation part 59 against which a tip end of the wire W is butted, on the feeding path of the wire W that is curled by the curl guide 50 and guided to the binding unit 7 by the induction guide 51.

The retraction mechanism 54 includes an opening/closing regulation portion 54*b* configured to engage with the moving member 75 configured to move in conjunction with the sleeve 71 and to be in contact with an opening/closing regulation member 55*a* configured to operate in conjunction with the moving member 75. The opening/closing regulation portion 54*b* comes in contact with the opening/closing regulation member 55*a* in a state in which the retraction mechanism 54 has moved in the direction in which the first guide member 53*a* protrudes to the feeding path of the wire W, so that the rotation of the retraction mechanism 54 about the shaft 54*a* as a fulcrum is regulated.

In addition, when the opening/closing regulation member 55*a* is moved in conjunction with the operation of the binding unit 7 for locking the wire W with the locking member 70, and an opening portion 55*b* of the opening/closing regulation member 55*a* is moved to a position where it faces the opening/closing regulation portion 54*b* of the retraction mechanism 54, the opening/closing regulation portion 54*b* enters the opening portion 55*b*, so that the regulation of rotation of the retraction mechanism 54 about the shaft 54*a* as a fulcrum is released. Thereby, the retraction mechanism 54 can be moved by the rotating operation about the shaft 54*a* as a fulcrum, in the direction in which the first guide member 53*a* retracts with respect to the feeding path of the wire W.

<Example of Operation of Reinforcing Bar Binding Machine of Present Embodiment>

Subsequently, an operation of binding the reinforcing bars S with the wire W by the reinforcing bar binding machine 1A of the present embodiment will be described with reference to each drawing.

The reinforcing bar binding machine 1A is in a standby state where the wire W is sandwiched between the pair of feeding gears 30 and the tip end of the wire W is located between a sandwiched position by the feeding gears 30 and the fixed blade part 60 of the cutting unit 6. Also, when the reinforcing bar binding machine 1A is in the standby state, the sleeve 71 and the first side hook 70R, the second side hook 70L and the center hook 70C attached to the sleeve 71 are moved in the rear direction denoted with the arrow A2, and as shown in FIG. 3A, the first side hook 70R is opened with respect to the center hook 70C, and the second side hook 70L is opened with respect to the center hook 70C.

When the reinforcing bars S are inserted between the curl guide 50 and the induction guide 51 of the curl forming unit 5 and a trigger 12 is operated, the feeding motor (not shown) is driven in the forward rotation direction, so that the wire W is fed in the forward direction denoted with the arrow F by the wire feeding unit 3A.

In a configuration where a plurality of, for example, two wires W are fed, the two wires W are fed aligned in parallel along an axis direction of the loop Ru, which is formed by the wires W, by the wire guide 4.

The wire W fed in the forward direction passes between the center hook 70C and the first side hook 70R, and is then fed to the curl guide 50 of the curl forming unit 5. The wire W passes through the curl guide 50 and is thus curled to be wound around the reinforcing bars S.

The wire W curled by the curl guide 50 is guided to the induction guide 51 and is further fed in the forward direction by the wire feeding unit 3A, so that the wire is guided between the center hook 70C and the second side hook 70L by the induction guide 51. Then, the wire W is fed until the tip end is butted against the feeding regulation part 59. When the wire W is fed to a position at which the tip end is butted against the feeding regulation part 59, the drive of the feeding motor (not shown) is stopped.

After stopping the feeding of the wire W in the forward direction, the motor 80 is driven in the forward rotation direction. In the first operation area where the wire W is locked by the locking member 70, the rotation regulation blade 74*a* is locked, so that the rotation of the sleeve 71 in conjunction with the rotation of the rotary shaft 72 is regulated. Thereby, the rotation of the motor 80 is converted into linear movement, so that the sleeve 71 is moved in the forward direction denoted with the arrow A1.

When the sleeve 71 is moved in the forward direction denoted with the arrow A1, the first side hook 70R and the second side hook 70L of the locking member 70 are moved toward the center hook 70C by the rotating operations about the shaft 71*b* as a fulcrum, due to the locus of the opening/closing pin 71*a* and the shape of the opening/closing guide holes 73R and 73L.

That is, when the sleeve 71 is moved in the forward direction denoted with the arrow A1, the inner wall surface of the first side hook 70R with respect to the direction in which the first side hook 70R is closed is pushed by the opening/closing pin 71*a*, in the opening/closing portion 73*a* formed in the opening/closing guide hole 73R. Thereby, the first side hook 70R is rotated about the shaft 71*b* as a fulcrum and is moved toward the center hook 70C.

In addition, when the sleeve 71 is moved in the forward direction denoted with the arrow A1, the inner wall surface of the second side hook 70L with respect to the direction in which the second side hook 70L is closed is pushed by the opening/closing pin 71*a*, in the opening/closing portion 73*a* formed in the opening/closing guide hole 73L. Thereby, the second side hook 70L is rotated about the shaft 71*b* as a fulcrum and is moved toward the center hook 70C.

Thereby, the first side hook 70R and the second side hook 70L are closed with respect to the center hook 70C.

When the first side hook 70R is closed with respect to the center hook 70C, the wire W sandwiched between the first side hook 70R and the center hook 70C is locked in such a manner that the wire can move between the first side hook 70R and the center hook 70C.

On the other hand, when the second side hook 70L is closed with respect to the center hook 70C, the wire W sandwiched between the second side hook 70L and the center hook 70C is locked in such a manner that the wire cannot come off between the second side hook 70L and the center hook 70C, within the range in which the opening/closing pin 71*a* is located at the locking portion 73*b* of the opening/closing guide hole 73L, as shown in FIG. 3B.

After advancing the sleeve 71 to a position, at which the opening/closing pin 71*a* is located at the locking portion 73*b* of the opening/closing guide hole 63L and the wire W is locked, by the closing operation of the first side hook 70R and the second side hook 70L, the rotation of the motor 80 is temporarily stopped and the feeding motor (not shown) is driven in the reverse rotation direction.

Thereby, the pair of feeding gears 30 is reversely rotated and the wire W sandwiched between the pair of feeding gears 30 is fed in the reverse direction denoted with the arrow R. Since the tip end side of the wire W is locked in such a manner that the wire does not come off between the second side hook 70L and the center hook 70C, the wire W is wound on the reinforcing bars S by the operation of feeding the wire W in the reverse direction.

In addition, in the operation of winding the wire W on the reinforcing bars S, the induction part 57 of the retraction mechanism 54 is pushed by the wire W, so that the first guide member 53*a* retracts with respect to the feeding path of the wire W.

After the wire W is wound on the reinforcing bars S and the drive of the feeding motor (not shown) in the reverse rotation direction is stopped, the motor 80 is driven in the forward rotation direction, so that the sleeve 71 is further moved in the forward direction denoted with the arrow A1.

Figure 7A:
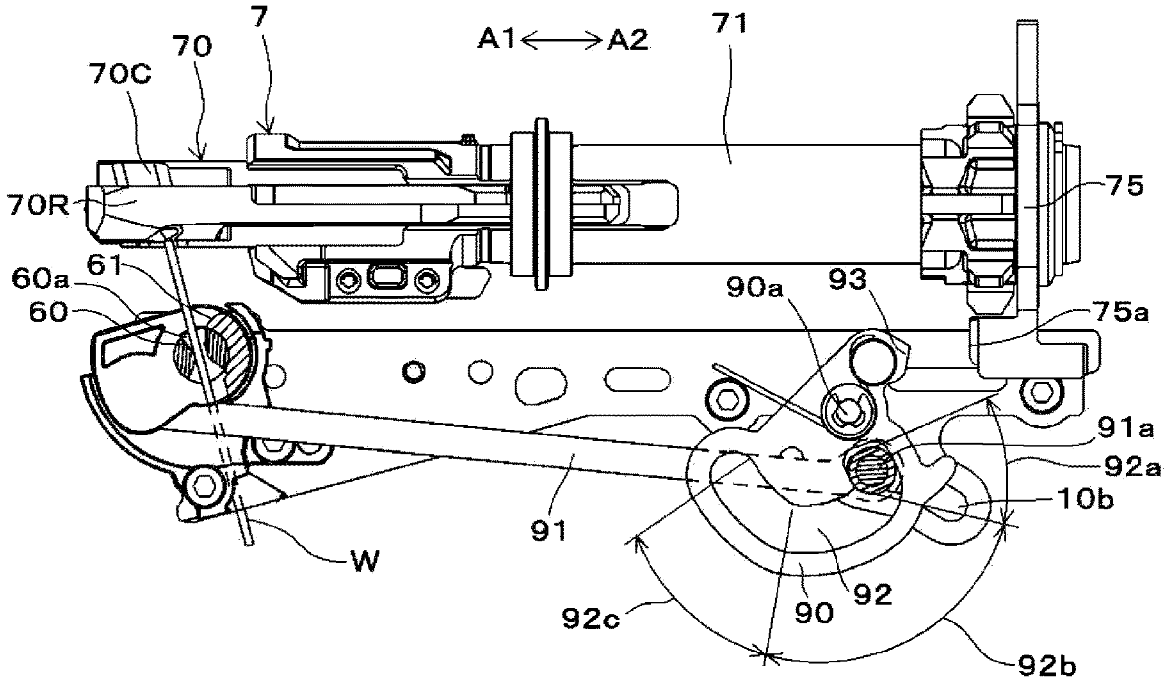
FIG. 7A is an operation explanatory diagram showing an example of operations of the binding unit, a transmission unit and the cutting unit according to the present embodiment.

FIGS. 7A to 7G are operation explanatory diagrams showing an example of the operations of the binding unit, the transmission unit and the cutting unit according to the present embodiment. As shown in FIG. 7A, when the sleeve 71 is moved in the forward direction denoted with the arrow A1, the moving member 75 is moved in the forward direction denoted with the arrow A1 in conjunction with the sleeve 71.

Figure 7B:
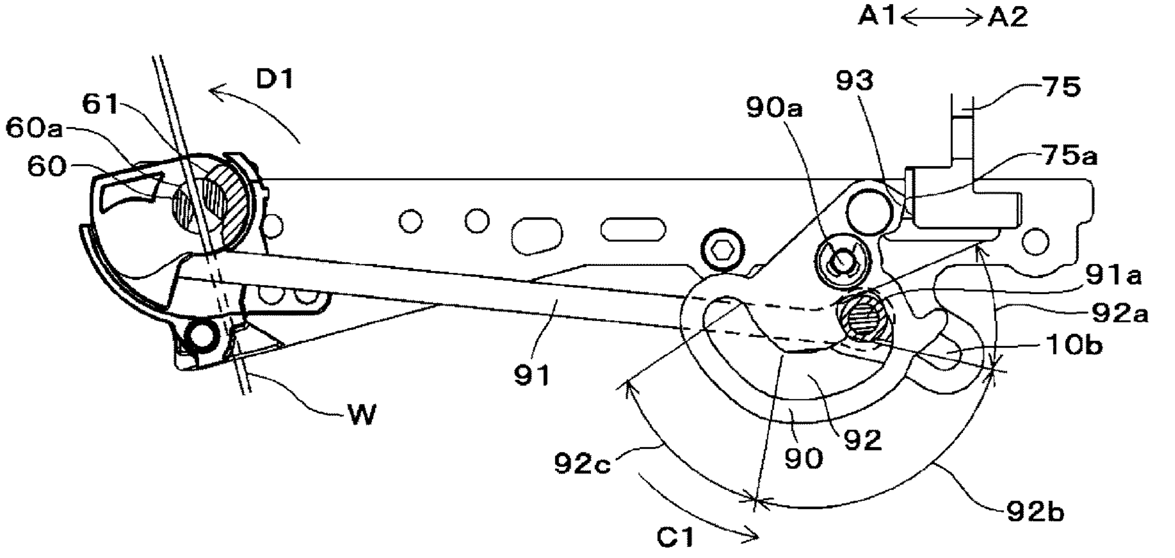
FIG. 7B is an operation explanatory diagram showing the example of operations of the binding unit, the transmission unit and the cutting unit according to the present embodiment.

As shown in FIG. 7B, the engaging portion 75*a* is engaged with the engaged portion 93 of the cam 90 by the operation of the moving member 75 moving in the forward direction denoted with the arrow A1. A region from when the sleeve 71 is moved in the forward direction denoted with the arrow A1 until the engaging portion 75*a* of the moving member 75 is engaged with the engaged portion 93 of the cam 90 is referred to as an idle running region.

When the moving member 75 is further moved in the forward direction denoted with the arrow A1, the engaged portion 93 is pushed forward, so that the cam 90 is rotated in the direction of the arrow C1 about the shaft 90*a* as a fulcrum. When the cam 90 is rotated in the direction of the arrow C1, a portion of the cam groove 92 intersecting the guide portion 10*b* changes, and the length from the shaft 90*a* of the cam 90 to the intersection of the cam groove 92 and the guide portion 10*b* changes in an increasing direction.

As for the link 91, the shaft portion 91*a* is inserted into the cam groove 92 and the guide portion 10*b* at the intersection of the cam groove 92 and the guide portion 10*b*, and the rotating operation of the cam 90 about the shaft 90*a* as a fulcrum moves the shaft portion 91*a* along the cam groove 92 and the guide portion 10*b*.

Thereby, when the cam 90 is rotated in the direction of the arrow C1 and the length from the shaft 90*a* of the cam 90 to the intersection of the cam groove 92 and the guide portion 10*b* changes in an increasing direction, the shaft portion 91*a* of the link 91 is moved along the cam groove 92 and the guide portion 10*b*, so that the shaft portion 91*a* is moved in the direction away from the shaft 90*a* of the cam 90.

As for the transmission unit 9, when the shaft portion 91*a* of the link 91 is moved in the direction away from the shaft 90*a* of the cam 90, the rotating operation of the cam 90 is converted into movement along the extension direction of the link 91.

Thereby, the rotating operation of the cam 90 is transmitted to the movable blade part 61 via the link 91, so that the movable blade part 61 is rotated in the direction of the arrow D1.

When the movable blade part 61 is rotated in the direction of the arrow D1, one wire W of the two wires W aligned in parallel is pressed against the end edge portion of the first butting portion 60*b* of the fixed blade part 60 by the operation of the movable blade part 61, and the other wire W enters the second butting portion 60*c* of the fixed blade part 60, so that the cutting of the one wire W is started prior to the other wire W.

Figure 7C:
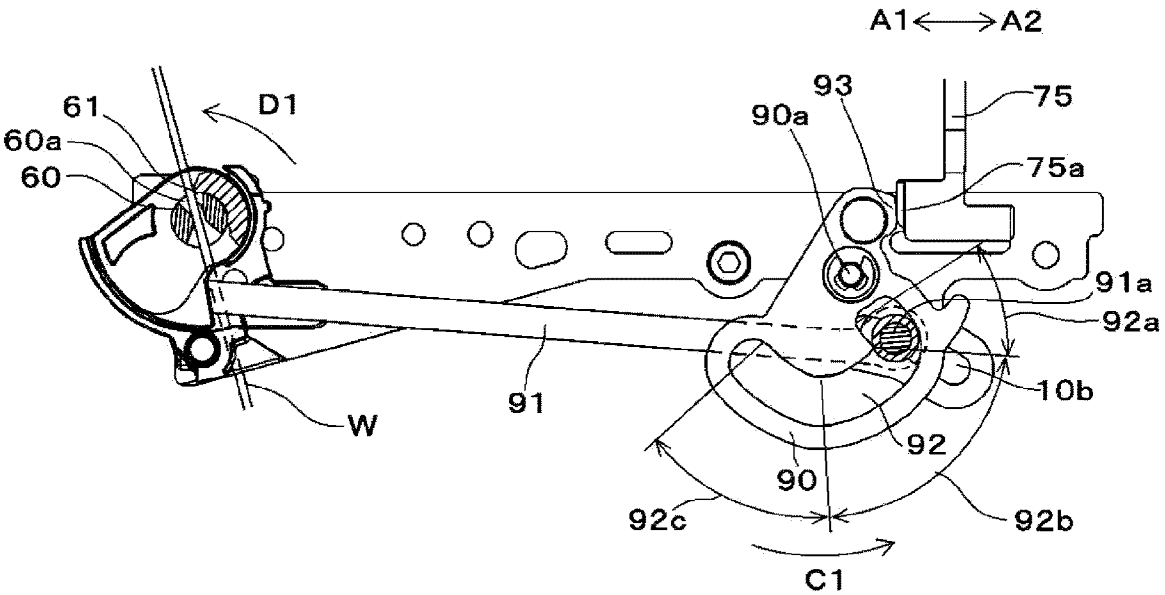
FIG. 7C is an operation explanatory diagram showing the example of operations of the binding unit, the transmission unit and the cutting unit according to the present embodiment.

A region from when the cam 90 is rotated in the direction of the arrow C1 about the shaft 90*a* as a fulcrum, so that the movable blade 61 is rotated in the direction of the arrow D1 until the cutting of the first wire W by the movable blade part 61 is started, as shown in FIG. 7C, is referred to as an idling region. The idle running region and the idling region are regions in which a load that is applied to the movable blade part 61 is low.

In the idling region, the first range 92*a* of the cam groove 92 intersects the guide portion 10*b*. While the first range 92*a* of the cam groove 92 intersects the guide portion 10*b*, the length from the shaft 90*a* to the intersection of the cam groove 92 and the guide portion 10*b* is shorter and the amount of change in length between the shaft 90*a* and the cam groove 92 becomes larger, as compared with the case where the second range 92*b* intersects the guide portion 10*b*.

Thereby, the amount of rotation of the movable blade part 61 becomes relatively large with respect to the amount of movement of the sleeve 71 that rotates the cam 90. On the other hand, in the idling region, since the cutting of the wire W has not been started, there is no wire cutting load that is applied to the movable blade part 61, so that an increase in load that is applied to the cam 90 connected to the movable blade part 61 via the link 91 is suppressed.

Since the cam 90 is connected to the sleeve 71 via the moving member 75, the increase in load that is applied to the cam 90 is suppressed, so that an increase in load that is applied to the rotary shaft 72 that moves the sleeve 71 and to the motor 80 connected to the rotary shaft 72 via the decelerator 81 is suppressed.

Therefore, in the region in which the load is low until the cutting of the first wire W is started, a time consumed to rotate the movable blade part 61 to a position where the cutting of the wire W is started can be shortened by relatively increasing the amount of rotation of the movable blade part 61.

Figure 7D:
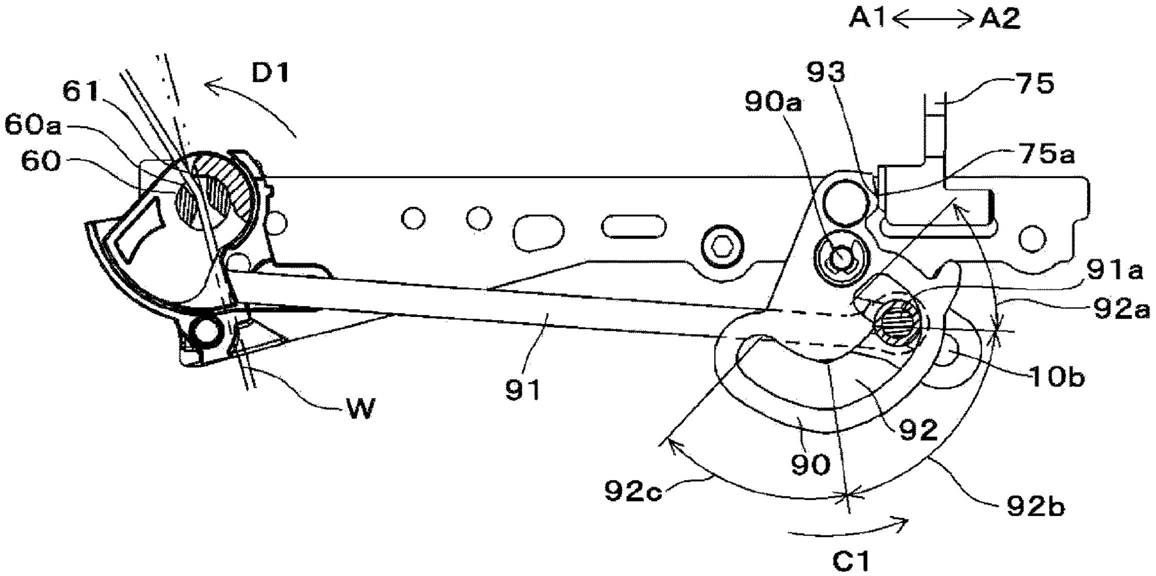
FIG. 7D is an operation explanatory diagram showing the example of operations of the binding unit, the transmission unit and the cutting unit according to the present embodiment.

When the moving member 75 is moved in the forward direction denoted with the arrow A1 to the position where the movable blade part 61 starts cutting of the first wire W, the cam 90 rotates about the shaft 90*a* as a fulcrum, as shown in FIG. 7D, so that the second range 92*b* of the cam groove 92 intersects the guide portion 10*b*.

While the second range 92*b* of the cam groove 92 intersects the guide portion 10*b*, the length from the shaft 90*a* of the cam 90 to the intersection of the cam groove 92 and the guide portion 10*b* changes in an increasing direction, and the shaft portion 91*a* of the link 91 is moved along the cam groove 92 and the guide portion 10*b*, so that the shaft portion 91*a* is moved in the direction away from the shaft 90*a* of the cam 90.

Thereby, the moving member 75 is further moved in the forward direction denoted with the arrow A1 to rotate the cam 90 in the direction of the arrow C1, and the rotating operation of the cam 90 is transmitted to the movable blade part 61 via the link 91, so that the movable blade part 61 is further rotated in the direction of the arrow D1 to start cutting of the first wire W.

After the movable blade part 61 is rotated in the direction of the arrow D1 to start cutting of the first wire W, which is one wire, when the first wire W is cut to a predetermined position, the second wire W, which is the other wire, is pressed against the end edge portion of the second butting portion 60*c* of the fixed blade part 60 by the operation of the movable blade part 61.

Thereby, cutting of the second wire W is started. In the present example, after starting the cutting of the first wire W, when the first wire W is cut in half or more in the radial direction, the cutting of the second wire W is started.

As described above, while the cutting of the first wire W is started and the second range 92*b* of the cam groove 92 intersects the guide portion 10*b*, the length from the shaft 90*a* to the intersection of the cam groove 92 and the guide portion 10*b* is longer and the amount of change in length between the shaft 90*a* and the cam groove 92 becomes smaller, as compared with the case where the first range 92*a* intersects the guide portion 10*b*.

Thereby, the amount of rotation of the movable blade part 61 becomes relatively small with respect to the amount of movement of the sleeve 71. On the other hand, the force that can be generated by the movable blade part 61 by operating the movable blade part 61 with the cam 90 via the link 91 increases.

When the cutting of the first wire W is started, the load that is applied to the movable blade part 61 increases. On the other hand, the force that can be generated by the movable blade part 61 increases, so that the load that is applied to the movable blade part 61 is canceled and the increase in load that is applied to the cam 90 connected to the movable blade part 61 via the link 91 is suppressed.

The increase in load that is applied to the cam 90 is suppressed, so that an increase in load that is applied to the rotary shaft 72 that moves the sleeve 71 and to the motor 80 connected to the rotary shaft 72 via the decelerator 81 is suppressed.

Figure 7E:
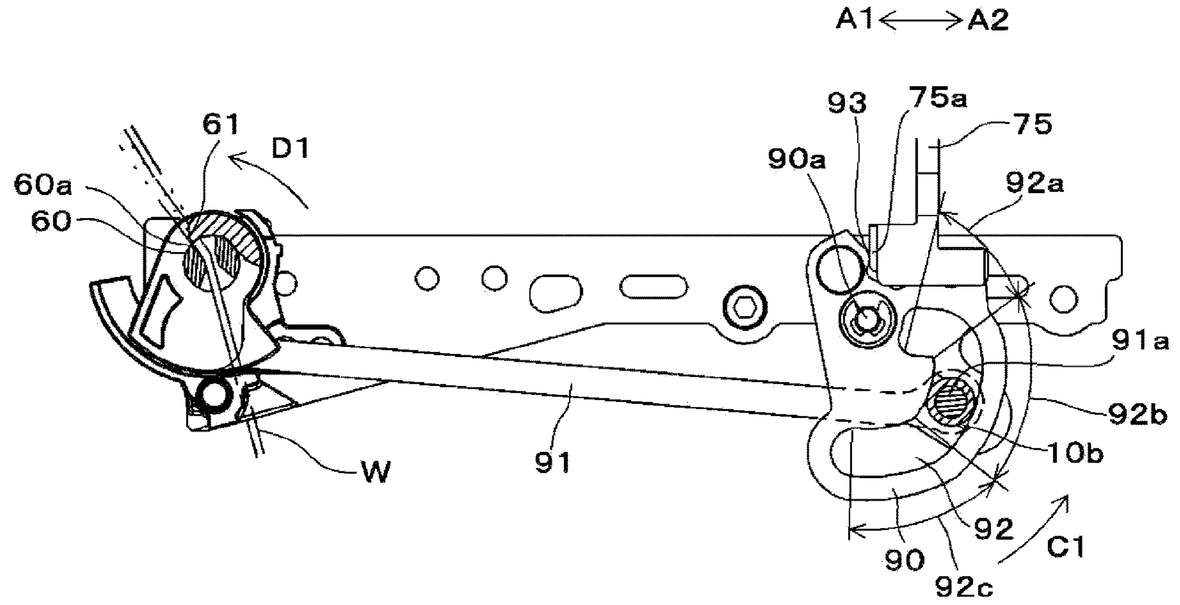
FIG. 7E is an operation explanatory diagram showing the example of operations of the binding unit, the transmission unit and the cutting unit according to the present embodiment.

When the movable blade part 61 is rotated in the direction of the arrow D1 and the moving member 75 is moved in the forward direction denoted with the arrow A1 from the position where the cutting of the first wire W is started to the position where the cutting of the second wire W is started, the cam 90 is rotated about the shaft 90*a* as a fulcrum, as shown in FIG. 7E, so that the second range 92*b* of the cam groove 92 intersects the guide portion 10*b*.

When the movable blade part 61 is further rotated in the direction of the arrow D1, the cutting of the one wire W for which cutting has been started first is completed. When the movable blade part 61 is further rotated in the direction of the arrow D1, the cutting of the other wire W for which cutting has been started later is completed.

Figure 7F:
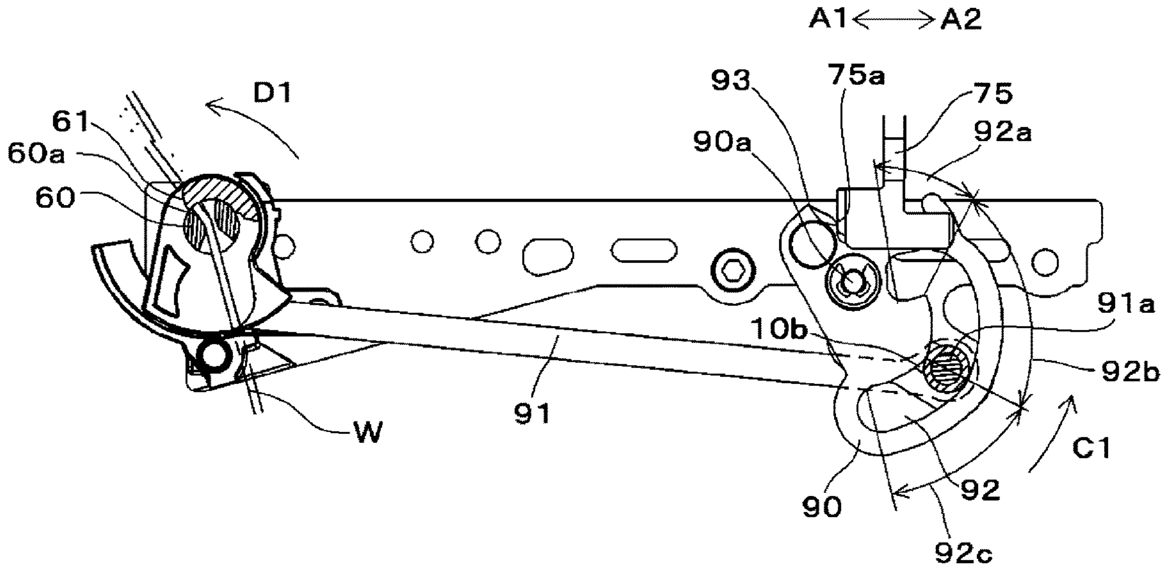
FIG. 7F is an operation explanatory diagram showing the example of operations of the binding unit, the transmission unit and the cutting unit according to the present embodiment.

When the movable blade part 61 is rotated in the direction of the arrow D1 and the moving member 75 is moved in the forward direction denoted with the arrow A1 from a position where the cutting of the second wire W is started to a position where the cutting of the second wire W ends, as described above, the cam 90 is rotated about the shaft 90*a* as a fulcrum, as shown in FIG. 7F, so that the second range 92*b* of the cam groove 92 intersects the guide portion 10*b*.

When the cutting of the second wire W is started, the load that is applied to the movable blade part 61 further increases. On the other hand, the force that can be generated by the movable blade part 61 increases, so that the load that is applied to the movable blade part 61 is canceled and the increase in load that is applied to the cam 90 connected to the movable blade part 61 via the link 91 is suppressed.

The increase in load that is applied to the cam 90 is suppressed, so that an increase in load that is applied to the rotary shaft 72 that moves the sleeve 71 and to the motor 80 connected to the rotary shaft 72 via the decelerator 81 is suppressed.

Therefore, in a region in which the load is high from when the cutting of the first wire W is started until the cutting of the second wire W ends, the increase in load that is applied to the motor 80 can be suppressed by increasing the force that can be generated by the movable blade part 61. In addition, in the region in which the load is high, the amount of rotation of the movable blade part 61 becomes relatively small, but in the region in which the load is low, the time consumed until the cutting of the wire W ends can be suppressed from lengthening by relatively increasing the amount of rotation of the movable blade part 61.

Figure 7G:
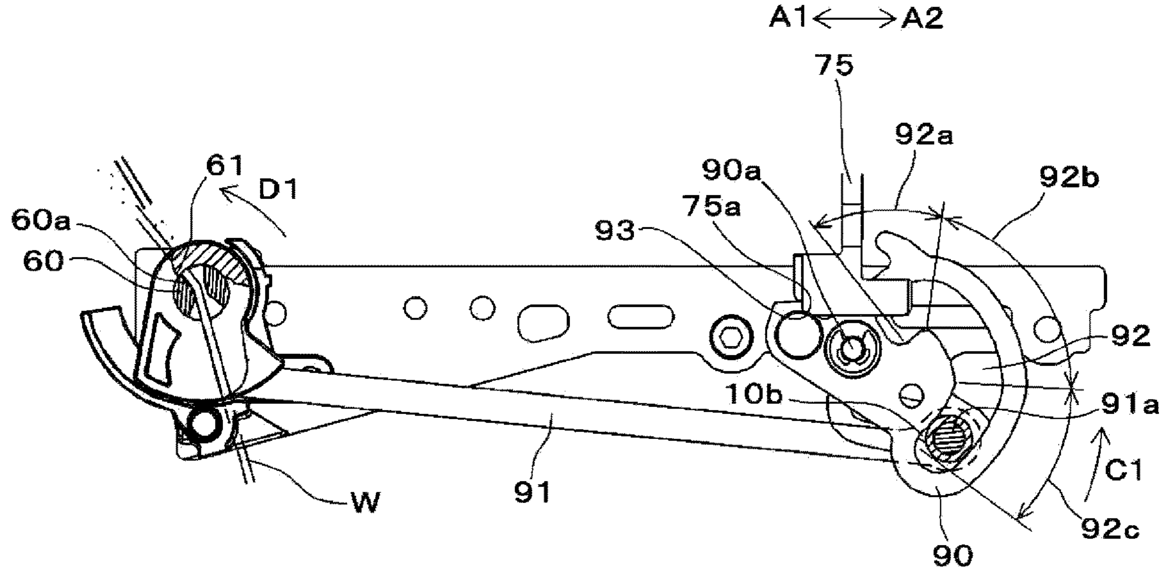
FIG. 7G is an operation explanatory diagram showing the example of operations of the binding unit, the transmission unit and the cutting unit according to the present embodiment.

When the moving member 75 is moved in the forward direction denoted with the arrow A1 to the position where the movable blade part 61 ends the cutting of the second wire W, the cam 90 is rotated about the shaft 90*a* as a fulcrum, as shown in FIG. 7G, so that the third range 92*c* of the cam groove 92 intersects the guide portion 10*b*.

While the third range 92*c* of the cam groove 92 intersects the guide portion 10*b*, the length from the shaft 90*a* to the intersection of the cam groove 92 and the guide portion 10*b* is substantially equivalent and the amount of change in length between the shaft 90*a* and the cam groove 92 is further smaller and becomes substantially constant, as compared with the case where the second range 92*b* intersects the guide portion 10*b*.

Thereby, the relative amount of rotation of the movable blade part 61 becomes smaller with respect to the amount of movement of the sleeve 71. When the cutting of the wire W ends, it is not necessary to rotate the movable blade part 61. On the other hand, after the cutting of the wire W, in order to bend the wire W, the sleeve 71 needs to be moved in the forward direction denoted with the arrow A1.

Therefore, while the third range 92*c* of the cam groove 92 intersects the guide portion 10*b*, the amount of rotation of the movable blade part 61 is reduced with respect to the amount of movement of the sleeve 71, and the increase in load due to the rotation of the movable blade part 61 after the cutting of the wire W is suppressed, so that the increase in load that is applied to the cam 90 connected to the movable blade part 61 via the link 91 is suppressed.

Therefore, in the region from when the cutting of the second wire W ends until the movement of the sleeve 71 is stopped, the increase in load that is applied to the cam 90 due to the rotation of the movable blade part 61 is suppressed, so that the increase in load that is applied to the rotary shaft 72 that moves the sleeve 71 and to the motor 80 connected to the rotary shaft 72 via the decelerator 81 can be suppressed.

Note that, the amount of movement of the sleeve 71 per rotation of the rotary shaft 72 is defined by a lead angle of the feeding screw 72*a*. Therefore, the lead angle of the feeding screw 72*a* is increased with respect to the reinforcing bar binding machine of the related art. On the other hand, in the region in which the load that is applied to the movable blade part 61 is high, the amount of rotation of the movable blade part 61 becomes relatively small, but the force that can be generated by the movable blade part 61 is increased, and in the region in which the load that is applied to the movable blade part 61 is low, the amount of rotation of the movable blade part 61 is relatively increased. Thereby, the time consumed until the cutting of the wire W ends can be suppressed from lengthening, and a time required for the whole binding operation can be shortened, as compared with the related art.

Further, in the operation of cutting the wire W whose cross-sectional shape is circular, the load becomes highest immediately before the wire that the blade part has reached a position of a diameter is cut. Therefore, in the configuration where the two wires W aligned in parallel are cut, a phase difference is provided for timings at which the cuttings of the wires W are started. First, after starting the cutting of the first wire W, when the wire W is cut to a position of a half or more in the radial direction, the cutting of the second wire W is started.

As compared with a case where two wires W aligned in parallel are cut at the same time, cutting one wire W reduces the load. Thereby, the load is reduced by starting the cutting of one wire W in advance. In addition, after the first wire W is cut to the position of a half or more in the radial direction and therefore the position where the load is the highest is passed, the cutting of the second wire W is started. Thereby, even when the two wires W are cut, the load is reduced. Further, the cutting of the second wire W is started before the cutting of the first wire W is completed. Thereby, an increase in time required for the cutting is suppressed.

Further, when the sleeve 71 is moved in the forward direction denoted with the arrow A1 by the operation of cutting the wire W wound on the reinforcing bars S, and as shown in FIG. 3C, the opening/closing pin 71*a* is moved to the range in which it is located at the unlocking portion 73*c* of the opening/closing guide hole 73L, the second side hook 70L becomes movable in the direction away from the center hook 70C by a predetermined amount.

As described above, in the operation of feeding the wire W in the reverse direction and winding the wire on the reinforcing bars S, the tip end side of the wire W needs to be locked in such a manner that the wire does not come off between the second side hook 70L and the center hook 70C. On the other hand, a reactive force of the force for pressing the wire W against the center hook 70C with the second side hook 70L is applied to the sleeve 71, and this reactive force becomes the load that is applied to the rotary shaft 72 that moves and rotates the sleeve 71 and to the motor 80 connected to the rotary shaft 72 via the decelerator 81.

Therefore, the second side hook 70L is provided with the locking portion 73*b* and the unlocking portion 73*c* in the opening/closing guide hole 73L, and in the operation of winding the wire W on the reinforcing bars S, the sleeve 71 is moved to the position where the opening/closing pin 71*a* faces the locking portion 73*b* of the opening/closing guide hole 73L, and after the wire W is wound on the reinforcing bars S, the sleeve 71 is moved to the position where the opening/closing pin 71*a* faces the unlocking portion 73*c* of the opening/closing guide hole 73L.

Thereby, in the operation of winding the wire W on the reinforcing bars S, the tip end side of the wire W can be locked in such a manner that the wire does not come off between the second side hook 70L and center hook 70C. In addition, after winding the wire W on the reinforcing bars S, the second side hook 70L becomes movable in the direction away from the center hook 70C by a predetermined amount, the reactive force of the force of pressing the wire W against the center hook 70C with the second side hook 70L is reduced, and the load that is applied to the motor 80 is reduced.

By driving the motor 80 in the forward rotation direction, the sleeve 71 is moved in the forward direction denoted with the arrow A1, so that the bent portions 71*c*1 and 71*c*2 are moved toward the reinforcing bars S almost simultaneously with the cutting of the wire W as described above. Thereby, the tip end side of the wire W locked by the center hook 70C and the second side hook 70L is pressed toward the reinforcing bars S and bent toward the reinforcing bars S at the locking position as a fulcrum by the bending portion 71*c*1. The sleeve 71 is further moved in the forward direction, so that the wire W locked between the second side hook 70L and the center hook 70C is maintained sandwiched by the bending portion 71*c*1.

In addition, the terminal end side of the wire W locked by the center hook 70C and the first side hook 70R and cut by the cutting unit 6 is pressed toward the reinforcing bars S and bent toward the reinforcing bars S at the locking position as a fulcrum by the bending portion 71*c*2. The sleeve 71 is further moved in the forward direction, so that the wire W locked between the first side hook 70R and the center hook 70C is maintained sandwiched by the bending portion 71*c*2.

After bending the tip end side of the wire W and the terminal end side after the cutting toward the reinforcing bars S, the motor 80 is further driven in the forward rotation direction, so that the sleeve 71 is further moved in the forward direction. When the sleeve 71 is moved to a predetermined position and therefore reaches the operation region in which the wire W locked by the locking member 70 is twisted, the locking of the rotation regulation blade 74*a* is released.

Thereby, the motor 80 is further driven in the forward rotation direction, so that the sleeve 71 is rotated in conjunction with the rotary shaft 72 and the wire W locked by the locking member 70 is twisted.

In the second operation region in which the sleeve 71 is rotated to twist the wire W, the binding unit 7 twists the wire W locked by the locking member 70, so that a force of pulling the sleeve 71 forward along the axis direction of the rotary shaft 72 is applied. On the other hand, when a force to move the sleeve 71 forward along the axis direction is applied, the rotary shaft 72 moves forward while receiving a force pushed backward by the spring 72*c*, and twists the wire W while moving forward.

Therefore, the wire W is twisted while the locking member 70, the sleeve 71, and the rotary shaft 72 are moved forward with receiving the force pushed backward by the spring 72*c*, and therefore, a gap between the twisted portion of the wire W and the reinforcing bar S becomes small and the wire is brought into close contact with the reinforcing bar S along the reinforcing bar S. Thereby, the slack before twisting the wire W can be removed, and the reinforcing bars S can be bound in a state where the wire W is in close contact with the reinforcing bars S.

When it is detected that the load that is applied to the motor 80 is maximized as the wire W is twisted, the forward rotation of the motor 80 is stopped. Next, when the motor 80 is driven in the reverse rotation direction, the rotary shaft 72 is reversely rotated and the sleeve 71 is reversely rotated in conjunction with the reverse rotation of the rotary shaft 72, the rotation regulation blade 74*a* is locked, so that the rotation of the sleeve 71 in conjunction with the rotation of the rotary shaft 72 is regulated. Thereby, the sleeve 71 is moved in the direction of the arrow A2, which is a backward direction.

When the sleeve 71 is moved in the backward direction, the bending portions 71*c*1 and 71*c*2 are away from the wire W, and the holding of the wire W by the bending portions 71*c*1 and 71*c*2 is released. In addition, when the sleeve 71 is moved in the backward direction, the opening/closing pin 71*a* passes through the opening/closing guide holes 73R and 73L. Thereby, the first side hook 70R is moved away from the center hook 70C by the rotating operation about the shaft 71*b* as a fulcrum. In addition, the second side hook 70L is moved away from the center hook 70C by the rotating operation about the shaft 71*b* as a fulcrum. Thereby, the wire W comes off from the locking member 70.

Note that, as in the opening/closing guide hole 73L of the modified embodiments shown in FIGS. 3D to 3F, in the configuration where the opening/closing guide hole 73L is provided with the second locking portion 73*d*, when the sleeve 71 is further moved in the forward direction to a position where the operation of twisting the wire W becomes possible, the opening/closing pin 71*a* is located at the second locking portion 73*d* of the opening/closing guide hole 73L. Thereby, even when the force by which the wire W is twisted is applied to the wire W, the wire W is suppressed from coming off between the second side hook 70L and the center hook 70C.

Modified Embodiment of Implementation of Transmission Unit

Figure 8A:
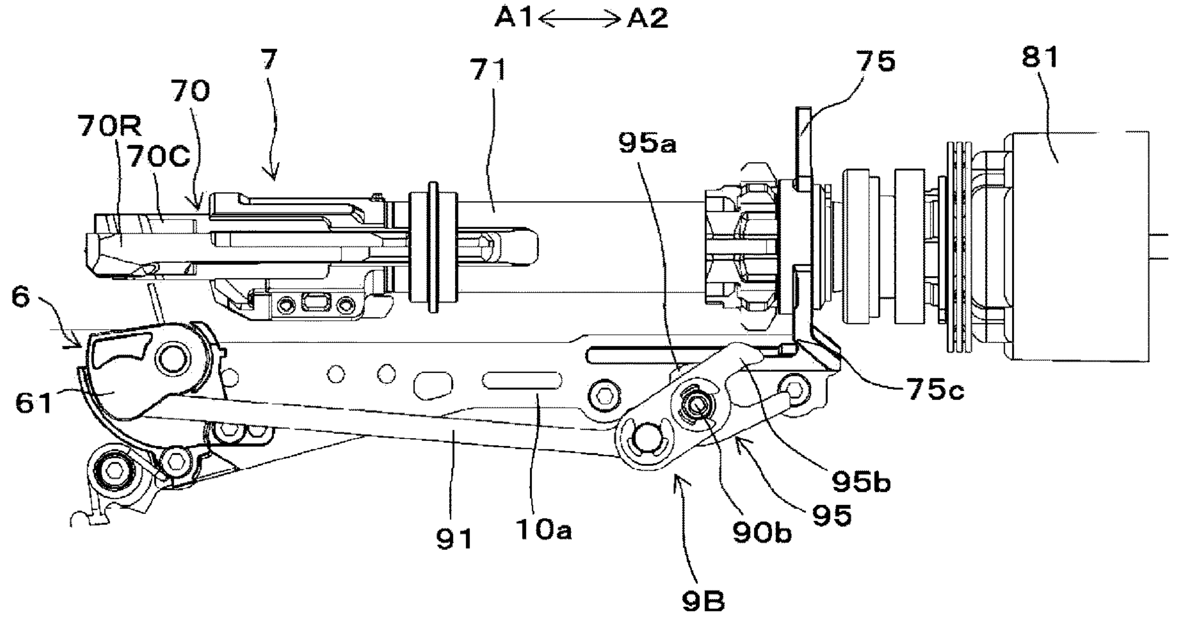
FIG. 8A is a side view showing a modified embodiment of the transmission unit according to the present embodiment.
Figure 8B:
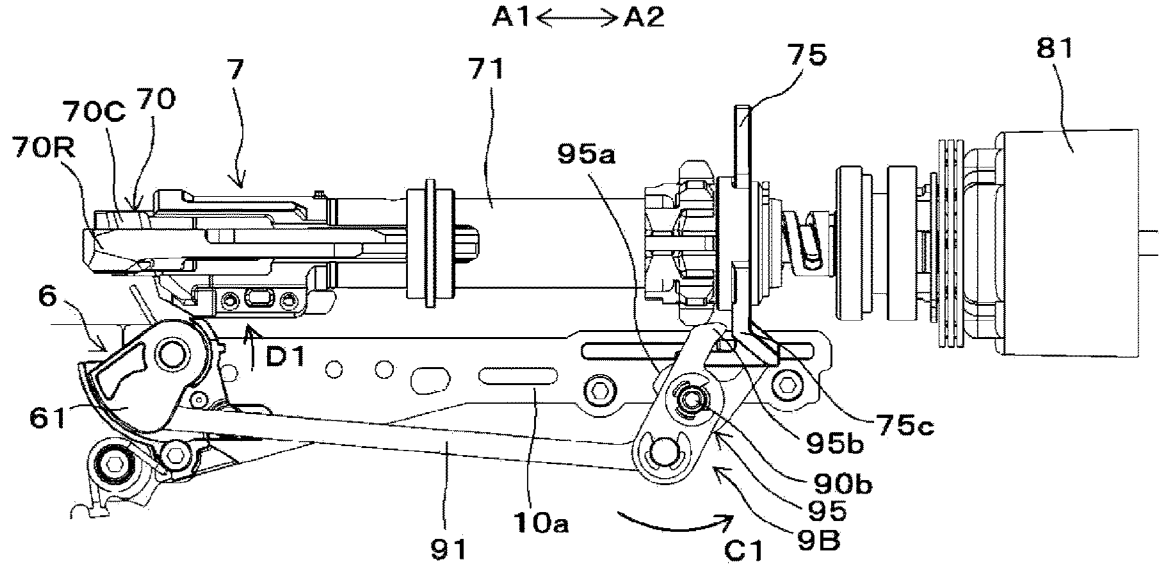
FIG. 8B is a side view showing the modified embodiment of the transmission unit according to the present embodiment.
Figure 8C:
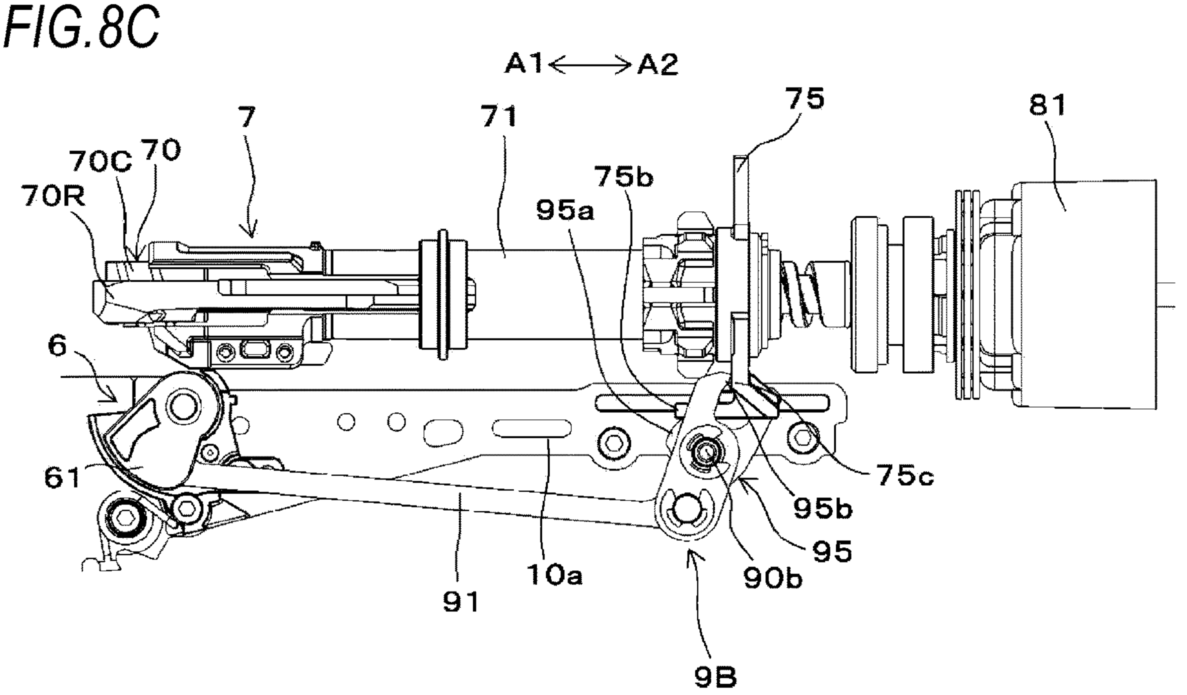
FIG. 8C is a side view showing the modified embodiment of the transmission unit according to the present embodiment.
Figure 9A:
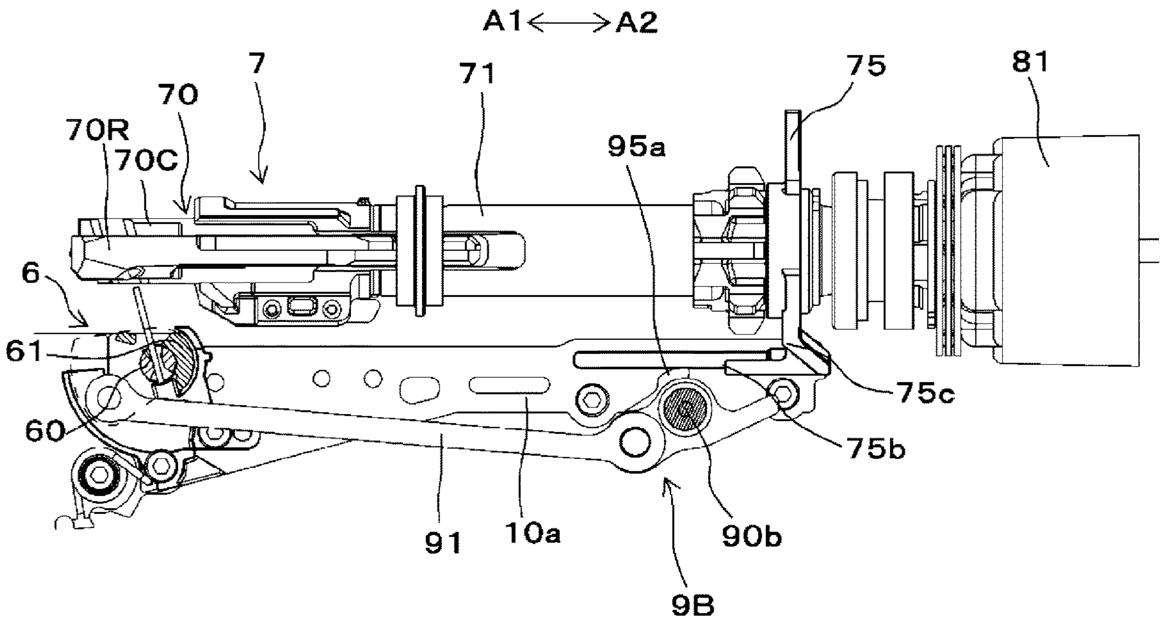
FIG. 9A is a side cross-sectional view showing the modified embodiment of the transmission unit according to the present embodiment.
Figure 9B:
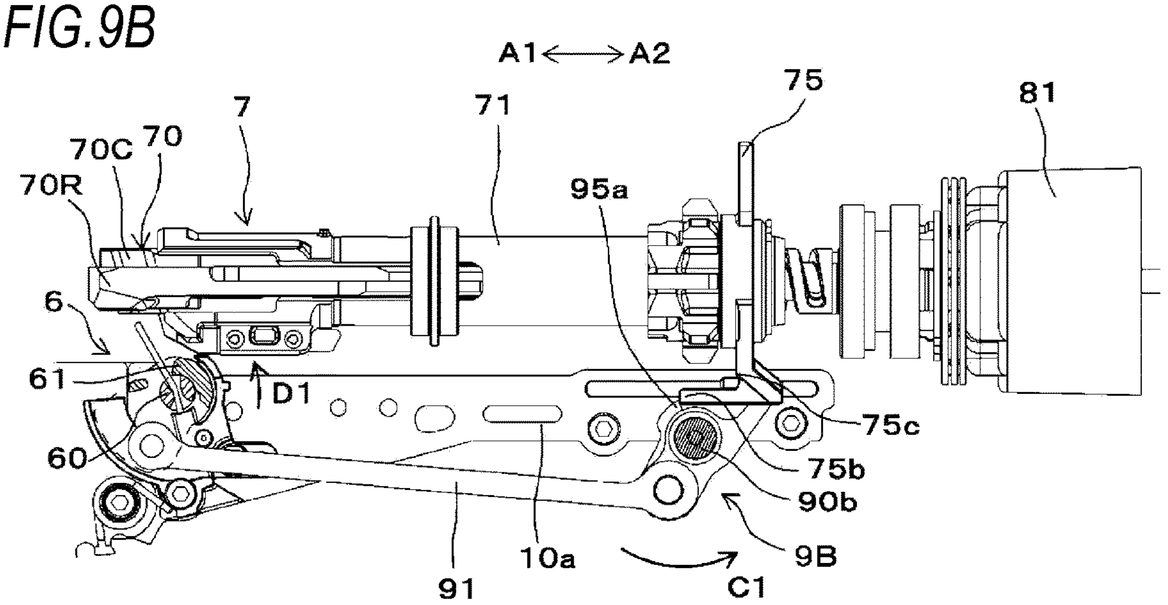
FIG. 9B is a side cross-sectional view showing the modified embodiment of the transmission unit according to the present embodiment.
Figure 9C:
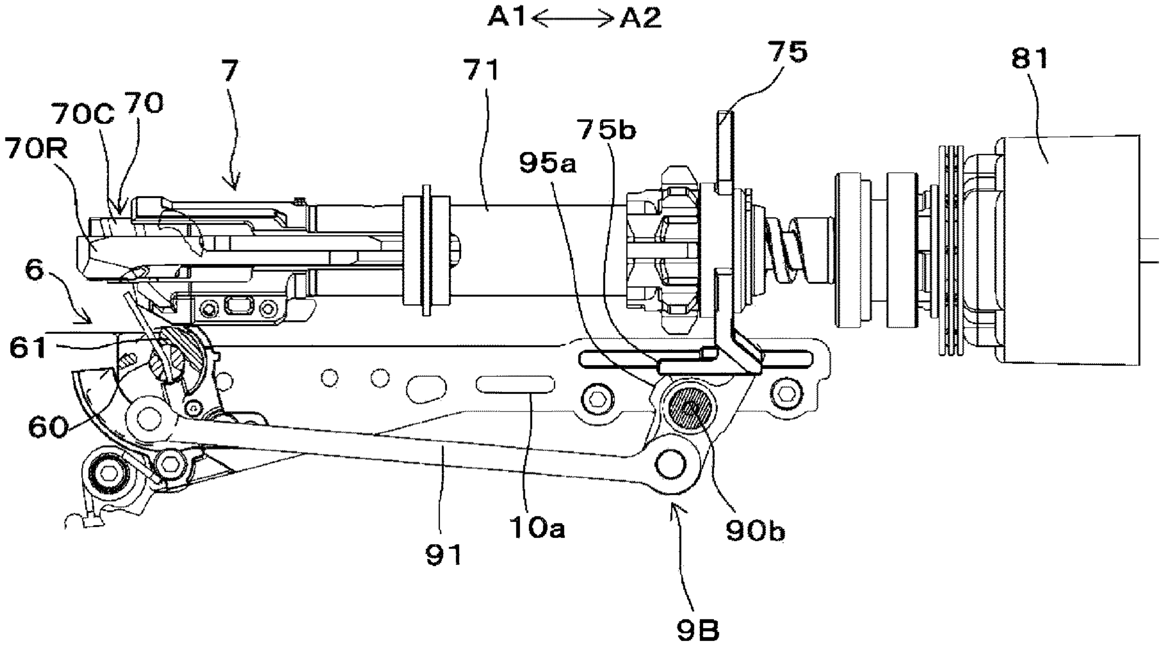
FIG. 9C is a side cross-sectional view of parts showing the modified embodiment of the transmission unit according to the present embodiment.

FIGS. 8A to 8C are side views showing a modified embodiment of the transmission unit of the present embodiment, and FIGS. 9A to 9C are side cross-sectional views showing the modified embodiment of the transmission unit of the present embodiment. Next, a transmission unit 9B of the modified embodiment of the present embodiment will be described with reference to each drawing.

The transmission unit 9B includes a cutter lever 95 configured to rotate by an operation of the binding unit 7, and a link 91 configured to connect the cutter lever 95 and the movable blade part 61. The transmission unit 9B is configured to transmit an operation of the binding unit 7 to the cutter lever 95 and the movable blade part 61 of the cutting unit 6 via the link 91.

The transmission unit 9B is supported so that the cutter lever 95 can rotate about the shaft 90*b* as a fulcrum. The shaft 90*b* is attached to the frame 10*a* attached to the inside of the main body part 10.

The cutter lever 95 is an example of the displacement member, and includes a first cutter lever 95*a* and a second cutter lever 95*b* connected to the sleeve 71 via the moving member 75. The cutter lever 95 is configured such that the first cutter lever 95*a* is engaged with the first engaging portion 75*b* provided to the moving member 75 and the second cutter lever 95*b* is engaged with the second engaging portion 75*c* provided to the moving member 75.

The cutter lever 95 is configured such that a length from an action point, which is the second connection portion connected to the sleeve 71, to be pushed by the moving member 75 configured to move in conjunction with the sleeve 71 to the shaft 90*b* is different in the first cutter lever 95*a* and the second cutter lever 95*b*. The length from the shaft 90*b* to the action point to be pushed by the moving member 75 is configured to be longer in the second cutter lever 95*b* than in the first cutter lever 95*a*.

That is, the length from the second engaging portion 75*c*, which is the action point to be pushed by the moving member 75 in the second cutter lever 95*b*, to the shaft 90*b* is configured to be greater than the length from the first engaging portion 75*b*, which is the action point to be pushed by the moving member 75 in the first cutter lever 95*a*, to the shaft 90*b*.

When the moving member 75 is moved in the forward direction in conjunction with the sleeve 71 moving in the forward direction denoted with the arrow A1, first, the first engaging portion 75*b* is engaged with the first cutter lever 95*a*. When the sleeve 71 is further moved in the forward direction denoted with the arrow A1, the second engaging portion 75*c* is engaged with the second cutter lever 95*b*. Further, the engagement between the first cutter lever 95*a* and the first engaging portion 75*b* is released.

As for the link 91, an end portion in the forward direction denoted with the arrow A1 is connected to the movable blade part 61, and an end portion in the backward direction denoted with the arrow A2 is connected to the cutter lever 95.

Next, operations of the transmission unit 9B are described. When the sleeve 71 is moved in the forward direction denoted with the arrow A1, the moving member 75 is moved in the forward direction denoted with the arrow A1 in conjunction with the sleeve 71. As shown in FIG. 9B, the first engaging portion 75*b* is engaged with the first cutter lever 95*a* by the moving operation of the moving member 75 in the forward direction denoted with the arrow A1.

When the moving member 75 is further moved in the forward direction denoted with the arrow A1, the cutter lever 95 is rotated in the direction of the arrow C1 about the shaft 90*b* as a fulcrum with a ratio corresponding to the length from the shaft 90*b* to the action point pushed by the first engaging portion 75*b* of the moving member 75 in the first cutter lever 95*a* with respect to the amount of movement of the sleeve 71.

When the cutter lever 95 is rotated in the direction of the arrow C1, the rotating operation of the cutter lever 95 is transmitted to the movable blade part 61 via the link 91, so that the movable blade part 61 is rotated in the direction of the arrow D1. Therefore, the movable blade part 61 is rotated in the direction of the arrow D1 by the moving operation of the sleeve 71 in the forward direction, so that cutting of the wire W is started.

When the sleeve 71 is further moved in the forward direction denoted with the arrow A1, the second engaging portion 75*c* of the moving member 75 is engaged with the second cutter lever 95*b*, as shown in FIG. 8C. Thereby, the cutter lever 95 is rotated in the direction of the arrow C1 about the shaft 90*b* as a fulcrum with a ratio corresponding to the length from the shaft 90*b* to action point pushed by the second engaging portion 75*c* of the moving member 75 in the second cutter lever 95*b* with respect to the amount of movement of the sleeve 71. Further, the engagement between the first cutter lever 95*a* and the first engaging portion 75*b* is released.

The duration for which the first cutter lever 95*a* and the first engaging portion 75*b* are engaged is a duration from when the movable blade part 61 starts rotation in the cutting unit 6 until the cutting of the first wire W is started. In addition, the duration for which the second cutter lever 95*b* and the second engaging portion 75*c* are engaged is a duration from when the movable blade part 61 is further rotated in the cutting unit 6 and the cutting of the first wire W is started until the cutting of the second wire W ends.

The cutter lever 95 is configured such that the length from the shaft 90*b* to the action point pushed by the moving member 75 is longer in the second cutter lever 95*b* than in the first cutter lever 95*a*. Thereby, while the first cutter lever 95*a* and the first engaging portion 75*b* are engaged, the amount of rotation of the movable blade part 61 becomes relatively large with respect to the amount of movement of the sleeve 71 that rotates the cutter lever 95.

On the other hand, since the cutting of the wire W is not started while the first cutter lever 95*a* and the first engaging portion 75*b* are engaged, the increase in load that is applied to the movable blade part 61 is suppressed, and the increase in load that is applied to the cutter lever 95 connected to the movable blade part 61 via the link 91 is suppressed.

Since the cutter lever 95 is connected to the sleeve 71 via the moving member 75, the increase in load that is applied to the cutter lever 95 is suppressed, so that the increase in load that is applied to the rotary shaft 72 that moves the sleeve 71 and to the motor 80 connected to the rotary shaft 72 via the decelerator 81 is suppressed.

Therefore, in the region in which the load is low until the cutting of the first wire W is started, a time consumed to rotate the movable blade part 61 to a position where the cutting of the wire W is started can be shortened by relatively increasing the amount of rotation of the movable blade part 61.

While the second cutter lever 95*b* and the second engaging portion 75*c* are engaged, the amount of rotation of the movable blade part 61 becomes relatively small with respect to the amount of movement of the sleeve 71 that rotates the cutter lever 95. On the other hand, since the length from the shaft 90*b* to the action point pushed by the moving member 75 is configured to be longer in the second cutter lever 95*b* than in the first cutter lever 95*a*, the force that can be generated by the movable blade part 61 from the cutter lever 95 via the link 91 increases.

When the cutting of the first wire W is started, the load that is applied to the movable blade part 61 increases. On the other hand, the force that can be generated by the movable blade part 61 increases, so that the load that is applied to the movable blade part 61 is canceled and the increase in load that is applied to the cutter lever 95 connected to the movable blade part 61 via the link 91 is suppressed.

The increase in load that is applied to the cutter lever 95 is suppressed, so that the increase in load that is applied to the rotary shaft 72 that moves the sleeve 71 and to the motor 80 connected to the rotary shaft 72 via the decelerator 81 is suppressed.

Therefore, in a region in which the load is high from when the cutting of the first wire W is started until the cutting of the second wire W ends, the increase in load that is applied to the motor 80 can be suppressed by increasing the force that can be generated by the movable blade part 61. In addition, in the region in which the load is high, the amount of rotation of the movable blade part 61 becomes relatively small, but in the region in which the load is low, the time consumed until the cutting of the wire W ends can be suppressed from lengthening by relatively increasing the amount of rotation of the movable blade part 61.

Note that, in the above embodiment, the cutter lever 75 has such a configuration that whether the first engaging portion 75*b* of the moving member 75 and the first cutter lever 95*a* are engaged or whether the second engaging portion 75*c* of the moving member 75 and the second cutter lever 95*b* are engaged is switched by the rotating operation of the cutter lever 85 about the shaft 90*b* as a fulcrum, and therefore, the length from the shaft 90*b* to the first connection portion connected to the sleeve 71 is switched.

Thereby, the cutter lever 95 makes it possible to switch the amount of rotation (amount of movement) of the movable blade part 61 and the force that can be generated by the movable blade part 61, within the rotating range (moving range) of the movable blade part 61.

On the other hand, the cutter lever 95 may have such a configuration that the portion to which the link 91 is connected can be switched by the rotating operation of the cutter lever 85 about the shaft 90*b* as a fulcrum, and therefore, the length from the shaft 90*b* to the second connection portion connected to the link 91 can be switched.

What is claimed is:

1. A binding machine comprising:

a wire feeding unit configured to feed a wire;

a curl forming unit configured to form a path along which the wire fed by the wire feeding unit is to be wound around an object;

a cutting unit configured to cut the wire wound on the object, and a binding unit configured to twist the wire wound on the object and cut by the cutting unit, wherein the binding unit comprises a locking member comprising a first hook and a second hook and configured to lock the wire by moving the first hook toward the second hook, and wherein the locking member comprises:

a locking part configured to lock the wire in a state in which the first hook has been moved toward the second hook, and an unlocking part configured to make it possible for the first hook to be movable away from the second hook with such an amount of movement that the locked wire does not come off between the first hook and the second hook, wherein the unlocking part is arranged closer to a tip end side of the locking member than the locking part.

2. The binding machine according to claim 1, wherein the locking member is configured:

to lock, by the locking part, the wire in a state in which the first hook has been moved toward the second hook, at a timing at which the wire is fed in a reverse direction by the wire feeding unit and the wire is wound on the object, and to make it possible for the first hook to be movable away from the second hook by the unlocking part at a timing at which the wire wound on the object is cut by the cutting unit, and at a timing at which the wire cut by the cutting unit is twisted by the binding unit.

3. The binding machine according to claim 1, wherein the locking member comprises:

a first locking part configured to lock the wire in a state in which the first hook has been moved toward the second hook, at a timing at which the wire is fed in a reverse direction by the wire feeding unit and the wire is wound on the object, and a second locking part configured to lock the wire in a state in which the first hook has been moved toward the second hook, at a timing at which the wire cut by the cutting unit is twisted by the binding unit.

4. The binding machine according to claim 1, wherein the binding unit comprises a sleeve comprising an opening/closing pin and configured to be movable to actuate the locking member, wherein the first hook has a guide hole extending along a moving direction of the sleeve, the opening/closing pin being inserted into the guide hole, wherein the locking part is formed by a first portion of a wall surface of the guide hole facing the opening/closing pin, and wherein the unlocking part is formed by a second portion of the wall surface of the guide hole facing the opening/closing pin.

5. The binding machine of claim 4, wherein the unlocking part includes a concave portion of the wall surface of the guide hole and includes a dimension greater than a diameter of the opening/closing pin.

6. The binding machine of claim 3, wherein the unlocking part is arranged between the first locking part and the second locking part.

* * * * *